(12) United States Patent
Aoyama et al.

(10) Patent No.: US 10,350,700 B2
(45) Date of Patent: Jul. 16, 2019

(54) WELDING APPARATUS

(71) Applicant: Shoji Aoyama, Osaka (JP)

(72) Inventors: Shoji Aoyama, Osaka (JP); Yoshitaka Aoyama, Osaka (JP)

(73) Assignee: Shoji Aoyama, Osaka (JP)

( * ) Notice: Subject to any disclaimer, the term of this patent is extended or adjusted under 35 U.S.C. 154(b) by 315 days.

(21) Appl. No.: 15/127,620

(22) PCT Filed: Mar. 27, 2014

(86) PCT No.: PCT/JP2014/058965
§ 371 (c)(1),
(2) Date: Sep. 20, 2016

(87) PCT Pub. No.: WO2015/145685
PCT Pub. Date: Oct. 1, 2015

(65) Prior Publication Data
US 2017/0129045 A1 May 11, 2017

(51) Int. Cl.
B23K 11/00 (2006.01)
B23K 11/11 (2006.01)
(Continued)

(52) U.S. Cl.
CPC .......... *B23K 11/314* (2013.01); *B23K 11/004* (2013.01); *B23K 11/115* (2013.01);
(Continued)

(58) Field of Classification Search
CPC ..... B23K 11/314; B23K 11/004; B23K 11/14; B23K 11/115; G05B 2219/45104; G05B 2219/45135
(Continued)

(56) References Cited

U.S. PATENT DOCUMENTS 3,598,952 A 8/1971 Roberson
6,653,590 B1 * 11/2003 Aoyama ................ B23K 11/14
219/86.25
2007/0278198 A1 * 12/2007 Aoyama ............ B23K 11/0053
219/136

FOREIGN PATENT DOCUMENTS

JP 1-143777 6/1989
JP 2-93710 4/1990
(Continued)

OTHER PUBLICATIONS

International Preliminary Report on Patentability and Written Opinion of the International Searching Authority dated Sep. 27, 2016 in International (PCT) Application No. PCT/JP2014/058965.
(Continued)

Primary Examiner — Thien S Tran
(74) Attorney, Agent, or Firm — Wenderoth, Lind & Ponack, L.L.P.

(57) ABSTRACT

A welding apparatus includes: a welding machine having a lower arm member, an upper arm member, and electrodes configured to advance and retreat; a robot device to which the welding machine is mounted; a support member including a vertical member substantially in a vertical direction, and a horizontal member substantially in a horizontal direction. The vertical member is mounted on one of the lower arm member and the upper arm member at a position away from the electrode of the one of the lower arm member and the upper arm member; and a parts-feeding device mounted to the horizontal member and configured to feed parts to the electrode.

7 Claims, 11 Drawing Sheets

(51) Int. Cl.
*B23K 11/14* (2006.01)
*B23K 11/31* (2006.01)

(52) U.S. Cl.
CPC ............ *B23K 11/14* (2013.01); *B23K 11/315* (2013.01); *G05B 2219/45104* (2013.01); *G05B 2219/45135* (2013.01)

(58) Field of Classification Search
USPC .................. 219/46.25, 93, 98, 99, 107, 136
See application file for complete search history.

(56) References Cited

FOREIGN PATENT DOCUMENTS

| | | |
|---|---|---|
| JP | 3-57486 | 6/1991 |
| JP | 2003-320463 | 11/2003 |
| JP | 2005-224860 | 8/2005 |
| JP | 2005-246578 | 9/2005 |
| JP | 3700025 | 9/2005 |
| JP | 3790887 | 6/2006 |
| JP | 2012-218069 | 11/2012 |

OTHER PUBLICATIONS

Office Action dated Jun. 17, 2014 in Japanese Application No. 2012-289357, with English translation.
International Search Report dated Jun. 24, 2014 in International (PCT) Application No. PCT/JP2014/058965.
Extended European Search Report dated Jan. 2, 2018 in corresponding European Patent Application No. 14887565.1.

* cited by examiner

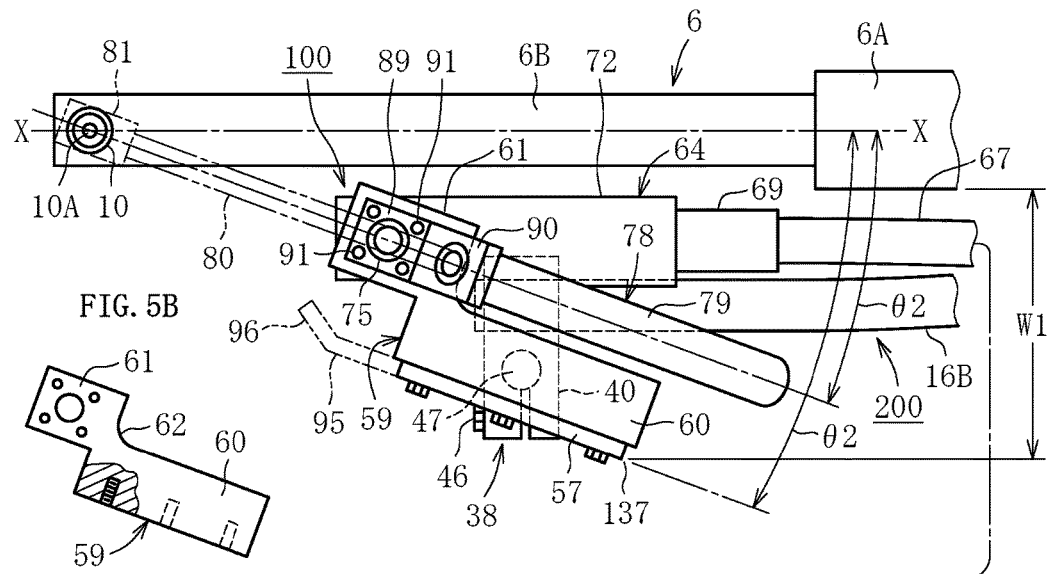
FIG. 5A
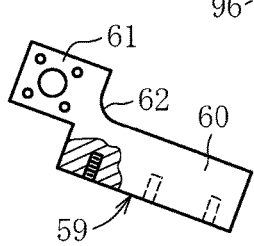
FIG. 5B
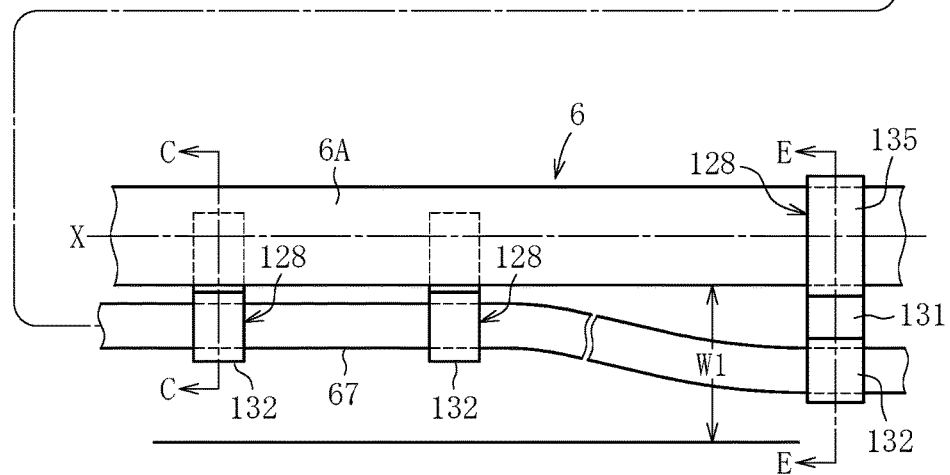
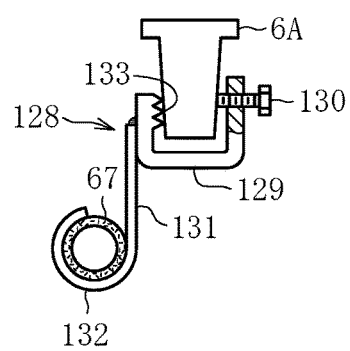
FIG. 5C
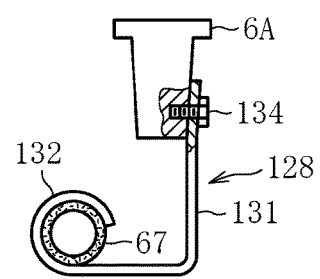
FIG. 5D
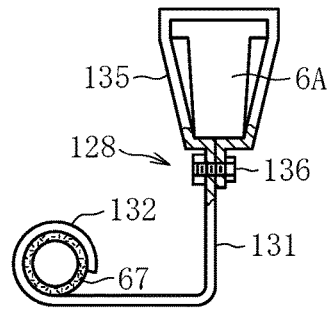
FIG. 5E

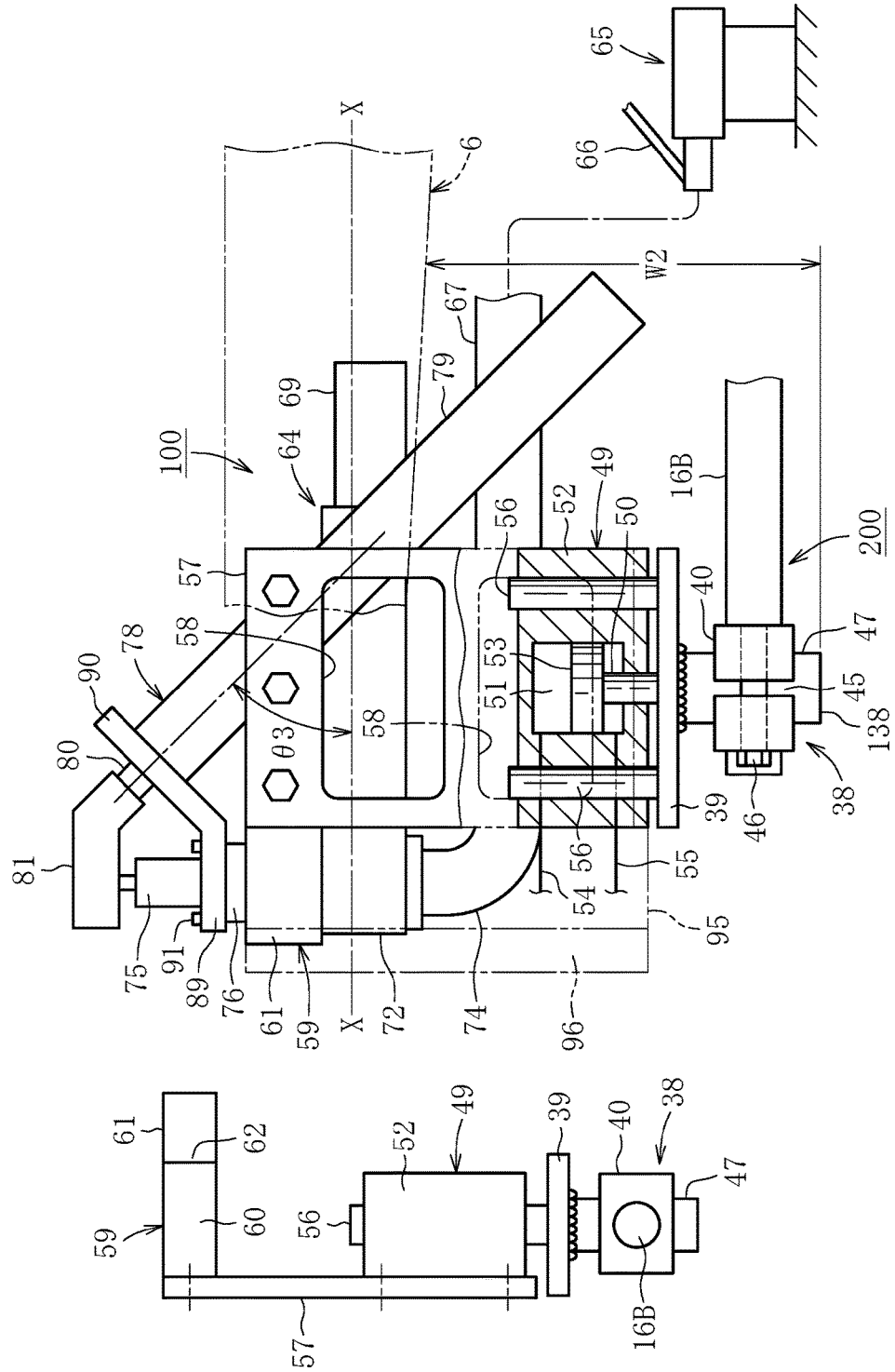

WELDING APPARATUS

TECHNICAL FIELD

The present invention relates to a welding apparatus comprising a welding machine, including a lower arm member having an electrode at a distal end portion thereof and an upper arm member having an electrode at a distal end portion thereof, and is configured to cause any one or both of the electrodes to advance and retreat, and a robot device mounted to the welding machine. The present invention also relates to a mounting structure for a parts-feeding device configured to feed parts to the electrode, a protective structure for the parts-feeding device, and an arrangement structure of a parts-feed hose configured to deliver the parts to the parts-feeding device.

BACKGROUND ART

The related art described in Japanese Patent No. 3,700,025 is as follows. Specifically, as illustrated in FIG. 1 of Japanese Patent No. 3,700,025, a pneumatic cylinder (16) serving as an insertion driver is fixed to a lower arm member (5a) of a welding machine, and a profection bolt feeding device (14) is mounted to a downward-oriented piston rod (17) of the pneumatic cylinder (16) through intermediation of an elongated coupling member (20). The coupling member (20) is an elongated bar-like member and is arranged in a positional relationship of extending in a direction substantially orthogonal to a longitudinal direction of the lower arm member (5a).

Further, the related art described in Japanese Patent No. 3,790,887 is as follows. Specifically, as illustrated in FIG. 1 of Japanese Patent No. 3,790,887, a pneumatic cylinder (20) serving as an insertion driver is mounted to a lower side of a lower arm member of a welding machine, and a pneumatic cylinder (30) and a feed rod (29) configured to feed bolts are mounted to a support plate (25) coupled to the pneumatic cylinder (20).

Further, in both Japanese Patent No. 3,700,025 and Japanese Patent No. 3,790,887, there is described that a feed hose is arranged in order to deliver parts from a parts feeder to a parts-feeding device.

CITATION LIST

Patent Literature 1: JP 3700025 B2
Patent Literature 2: JP 3790887 B2

SUMMARY OF INVENTION

Technical Problem

According to the technology described in Patent Literature 1, the elongated coupling member (20) is coupled to a lower end portion of the piston rod (17). Thus, when the large-mass bolt feeding device (14) including a feed rod (18), a holding head (22), and a pneumatic cylinder (19) is to be unified through intermediation of such structure of the piston rod (17) and the coupling member (20), a predetermined coupling rigidity is difficult to be secured. Further, the projection bolt feeding device (14) described in Patent Literature 1 is fixed and coupled to the lower arm member (5a). Thus, in this structure, the feeding device (14) cannot be adjusted in position relative to the lower arm member (5a). As a result, when the feed rod (18) is extended, it is difficult to align a bolt with electrodes.

As described above, when the large-mass bolt feeding device (14), that is, the parts-feeding device is to be mounted to the welding machine, a mounting strength with respect to the lower arm member needs to be sufficiently secured. At the same time, the parts-feeding device has its own size, and hence the parts-feeding device needs to be arranged close to the electrodes when the lower arm member is long. Further, it is important that the parts-feeding device and the electrodes that receive parts such as the bolts to be fed thereto be adjusted in their relative positions with accuracy and through simple work. In addition, in view of simplification of maintenance, it is important to provide the structure that allows removal of only the electrodes or only the parts-feeding device when the welding apparatus is to be overhauled.

Typically, the welding machine comprising the lower arm member and the upper arm member is manufactured and sold as an off-the-shelf product. Such a completed welding machine has a sufficiently high strength such that, even when a repulsive force generated at the time of a pressurizing operation by the electrodes is applied to the lower arm member and the upper arm member, each arm is not easily deformed. However, in a case where a device such as the parts-feeding device is to be mounted later to the lower arm member or the upper arm member of the off-the-shelf welding machine, when the lower arm member or the upper arm member is subjected to drilling or trimming, the rigidity of each arm may be impaired. Thus, when the parts-feeding device is to be additionally mounted, such risks need to be taken into consideration.

According to the technology described in Patent Literature 1, the pneumatic cylinder (16), the pneumatic cylinder (19), the feed rod (18), and the like constructing the projection bolt feeding device (14) are exposed directly to outside. Further, also according to Patent Literature 2, the pneumatic cylinder (20), the pneumatic cylinder (30), and the like are exposed directly to outside.

The welding apparatus described in Patent Literature 1 and Patent Literature 2 are each configured to be moved by a robot device in various directions such as upward and downward directions, leftward and rightward directions, and turning directions. However, with some cause such as a trouble in an actuation signal for actuating the robot device, a movement trajectory of the welding apparatus may be deviated from a normal movement trajectory. In case where such phenomenon occurs, the above-mentioned various pneumatic cylinders and the like may come into contact with adjacent members such as a bent part of a steel plate workpiece and a machine frame configured to hold the steel plate workpiece. As a result, the welding apparatus may be damaged.

The feed hoses described in Patent Literature 1 and Patent Literature 2 are each arranged in a predetermined posture of being substantially orthogonal to the lower arm member. Thus, when the welding machine is moved in the various directions such as the upward and downward directions, the rightward and leftward directions, and the turning directions through operations of the robot device, the feed hoses may come into contact with nearby members, or other similar problems may occur. As a result, the feed hoses may be damaged.

The present invention has been made to solve the problems described above. An object of the present invention is to provide a welding apparatus, which is configured such that a welding machine comprising a lower arm member and an upper arm member is moved by a robot device, and is capable of achieving, for example, improvement in a mounting rigidity of a parts-feeding device as well as easy adjustment for a mounting position of a parts-feeding device, protection of the parts-feeding device from damage, for example, in a case of an abnormal operation of the robot device or a case of entry of some unexpected member, and maintenance of a feed hose in a proper arrangement posture to thereby prevent interference with adjacent members irrespective of movement of the welding machine in any direction.

Solution to Problem

The present invention presents a welding apparatus, comprising:
a welding machine comprising:
a lower arm member extending substantially in a horizontal direction and comprising an electrode arranged at a distal end side of the lower arm member; and
an upper arm member extending substantially in the horizontal direction and comprising an electrode arranged at a distal end side of the upper arm member,
the welding machine being configured to cause any one or both of the electrodes to advance and retreat;
a robot device to which the welding machine is mounted;
a support member comprising:
a vertical member arranged substantially in a vertical direction; and
a horizontal member arranged substantially in the horizontal direction,
the vertical member being mounted on one of the lower arm member and the upper arm member at a position which is away from the electrode of the one of the lower arm member and the upper arm member; and
a parts-feeding device mounted to the horizontal member and configured to feed parts to be welded to a steel plate workpiece to the electrode of the one of the lower arm member and the upper arm member.

The vertical member may be mounted to the one of the lower arm member and the upper arm member such that the vertical member is adjustable in position in the vertical direction, and the parts-feeding device may be mounted to the horizontal member such that the parts-feeding device is adjusted in position in the horizontal direction.

Advantageous Effects of Invention

The parts-feeding device described above typically comprises a unit of mechanisms such as a feed rod comprising a holding head, an advancing and retracting driver configured to advance and retract the feed rod, and an insertion driver configured to cause the parts to be held by the electrode and has a predetermined mass. In order to mount the parts-feeding device to the welding machine, a mounting strength with respect to the lower arm member or the upper arm member needs to be sufficiently secured. At the same time, the parts-feeding device has its own size, and hence the parts-feeding device needs to be arranged close to the electrodes when the lower arm member and the upper arm member are long. Further, it is important that the parts-feeding device and the electrode of the lower arm member or the electrode of the upper arm member, which receives the parts to be fed thereto, be adjusted in their relative positions with accuracy and through simple work. In addition, in view of simplification of maintenance, it is important to provide the structure that allows removal of only the electrodes or only the parts-feeding device when the welding apparatus is to be overhauled.

The parts-feeding device configured to feed the parts, which are welded to the steel plate workpiece, to any one of the electrodes is mounted to the horizontal member. The vertical member is mounted on the lower arm member or the upper arm member at a position which is away from the electrode of the lower arm member or the electrode of the upper arm member.

By various movements of the robot device, such as rightward turning, leftward turning, upward turning, and downward turning, a high inertial load is applied at the position on the lower arm member or the upper arm member, to which the parts-feeding device is coupled. However, as described above, the vertical member is mounted at a high-rigidity position on the lower arm member or the upper arm member, which is away from the electrode of the lower arm member or the electrode of the upper arm member. Thus, a large inertial force is applied at this high-rigidity position, and hence problems such as an insufficient coupling strength at this coupling portion do not occur. With this configuration, a mounting rigidity of the parts-feeding device can be reliably secured. Typically, the lower arm member and the upper arm member are each formed into a thin shape having a cross-sectional area gradually reduced toward a distal end side. A separated part away from the distal end side has increased a cross-sectional area and rigidity. Such features of the lower arm member and the upper arm member are utilized to secure a satisfactory mounting rigidity.

In other words, with use of the support member comprising the vertical member and the horizontal member, the parts-feeding device need not be mounted to the distal end side of the lower arm member or the upper arm member. Thus, deformation of the distal end side of the lower arm member or the upper arm member, or displacement in relative position of both the electrodes can be prevented. When such displacement occurs, the parts such as a projection bolt is displaced from an electrode axial line. As a result, proper conduction of a welding current to the parts may be interfered, and hence failures in welding occur. Further, the configuration described above is free from such problems because it has the structure which is dependent on the high-rigidity position which is away from the electrode of the lower arm member or the electrode of the upper arm member.

Operations such as moving the parts-feeding device in the horizontal direction along the horizontal member and moving the parts-feeding device in the vertical direction along the vertical member can be easily performed. Thus, the parts-feeding device need not be mounted to a thin part of the lower arm member or the upper arm member, and can be easily arranged close to the electrodes.

Further, the support member comprises the vertical member and the horizontal member. Thus, a mounting position of the parts-feeding device can be easily adjusted through the position adjustment along the vertical member and the position adjustment along the horizontal member.

The support member comprising the vertical member and the horizontal member can be formed into a structurally simple shape. Thus, a rigidity of the support member itself can be easily set high. Therefore, a coupling rigidity can be sufficiently secured at the time of indirectly coupling the parts-feeding device to the high-rigidity position on the lower arm member or the upper arm member, which is away from the electrode of the lower arm member or the electrode of the upper arm member, through intermediation of the support member. In particular, when a phenomenon of deformation of the support member occurs due to the movements of the robot device, the parts cannot be accurately fed to the electrode. However, such problems can be prevented by the support member having the high rigidity.

The parts-feeding device is coupled to the high-rigidity position on the lower arm member or the upper arm member, which is away from the electrode of the lower arm member or the electrode of the upper arm member, through intermediation of the vertical member. Meanwhile, the electrode is mounted to the distal end side of the lower arm member or the upper arm member. Thus, at the time of maintenance for the electrode, the electrode can be handled while leaving the parts-feeding device on the lower arm member side or the upper arm member side. Further, at the time of maintenance of the parts-feeding device, the vertical member can be removed from the lower arm member or the upper arm member while leaving the electrode to perform the maintenance only for the parts-feeding device. In this way, maintenance can be independently performed only for necessary components. Thus, unnecessary removal of components is not performed, and hence it is effective for enhancing workability.

At a proximal portion formed on a side opposite to that of the electrode of the lower arm member and the electrode of the upper arm member, the lower arm member and the upper arm member may be coupled so as to be openable and closable with a shaft. Alternatively, the lower arm member and the upper arm member may be coupled integrally to each other on the proximal portion side, and the robot device may be coupled in the vicinity of this coupling portion. In any of the cases, it is important to prevent application of an excessive load to the shaft structure part and the coupling part of the robot device. According to the invention of the present application, the coupling position of the vertical member can be brought closer to the coupling parts of the shaft and the robot device. With this configuration, the excessive load can be alleviated, and hence it is effective for enhancing durability of an entirety of the apparatus is obtained.

Another aspect of the present invention, the vertical member is mounted to the lower arm member or the upper arm member such that the vertical member can be adjusted in position in the vertical direction, and the parts-feeding device is mounted to the horizontal member such that the parts-feeding device is adjustable in position in the horizontal direction.

Thus, an entirety of the parts-feeding device can be adjusted in position relative to the electrode in the vertical direction by moving the vertical member relative to the lower arm member or the upper arm member in the vertical direction. Further, the entirety of the parts-feeding device can be adjusted in position relative to the electrode in the horizontal direction by moving the entirety of the parts-feeding device relative to the horizontal member. In this way, position adjustment can be performed in the two directions including the vertical direction and the horizontal direction, and hence the relative position of the parts-feeding device and the electrode can be easily determined.

Another aspect of the present invention, the parts-feeding device is protected from both sides by a part of the parts-feeding device or a protective member coupled to the support member, and by the lower arm member or the upper arm member.

Another aspect of the present invention, in plan view, a clearance between the part of the parts-feeding device or the protective member and the lower arm member or the upper arm member is set so that the clearance becomes smaller on a side close to the electrodes.

The parts-feeding device is protected from both sides by the part of the parts-feeding device or the protective member coupled to the support member, and by the lower arm member or the upper arm member. Thus, with some cause such as a trouble in an actuation signal for the robot device, even when a movement trajectory of the welding apparatus is deviated from a normal movement trajectory to bring the parts-feeding device into contact with adjacent members such as a bent part of the steel plate workpiece and a machine frame configured to hold the steel plate workpiece, the parts-feeding device can be protected from damage.

The parts-feeding device is generally an assemblage of components such as the feed rod comprising the holding head, the advancing and retracting driver such as a pneumatic cylinder configured to advance and retract the feed rod, a feed hose configured to guide the parts, and the insertion driver such as a pneumatic cylinder configured to cause the parts to be held by the electrode. Those components are easily damaged when the welding apparatus is moved along an abnormal movement trajectory and, for example, collides against or comes into contact with the steel plate workpiece, the machine frame, or other components. However, by protective functions of the part of the parts-feeding device or the protective member, and of the lower arm member or the upper arm member, damage to the components is prevented.

The components such as the feed rod and the pneumatic cylinder are configured to perform accurate operations to reliably feed the parts to the electrode, and hence are each formed of a precision mechanism. These components with such characteristics are liable to be damaged by being subjected to high impact when the welding machine having a large mass is moved along the abnormal trajectory and, for example, collides against or comes into contact with the steel plate workpiece, the machine frame, or other components. For example, in a case where the welding machine welds parts such as the projection bolt to an automotive floor panel, the welding machine mainly comprising the lower arm member and the upper arm member is increased in size. Meanwhile, the components such as the feed rod and the pneumatic cylinder serve as the precision devices. When those components being the precision devices are subjected to impact in such a case, those components are significantly damaged. As a result, proper feeding of the parts can be interfered. According to the present invention, the protective structure as described above is employed. Thus, the parts-feeding device that is liable to be damaged is reliably protected, and a parts-feed function is prevented from being impaired.

Typically, the welding machine enters a narrow site, and accurately welds the parts at predetermined positions on the steel plate workpiece. In such an environment, the clearance between the part of the parts-feeding device or the protective member and the lower arm member or the upper arm member is set smaller on a side close to the electrodes in plan view, and hence the welding machine can easily enter the narrow site in which restrictions of space are severe. At the same time, interference with adjacent members can be easily prevented. In other words, the parts-feeding device can be prevented from entering the narrow site or interfering with the adjacent members in this way because the parts-feeding device is protected from both sides by the part of the parts-feeding device or the protective member and by the lower arm member or the upper arm member, and because the part of the parts-feeding device or the protective member and both the arm members are arranged in the V-shape in plan view.

Another aspect of the present invention, the welding apparatus further comprises a feed hose extending from a parts-feed source to the parts-feeding device. The feed hose is mounted to the lower arm member or the upper arm member with a fastener such that the feed hose is extended in a direction substantially the same as a longitudinal direction of the lower arm member or a longitudinal direction of the upper arm member, and that the feed hose is unchanged in position relative to the lower arm member or the upper arm member in a direction of a clearance between the feed hose and the lower arm member or the upper arm member.

Another aspect of the present invention, the feed hose is arranged within a space along the lower arm member or the upper arm member, and a horizontal width of the space is set equal to a clearance between the lower arm member or the upper arm member and an outer part of the parts-feeding device.

Another aspect of the present invention, a vertical width of the space is set equal to a clearance between the lower arm member or the upper arm member and an outer part of a mounting structure section through which the part-feeding device is mounted to the lower arm member or the upper arm member.

In order that the feed hose extending from the parts-feed source to the parts-feeding device extends in the direction substantially the same as the longitudinal direction of the lower arm member or the longitudinal direction of the upper arm member, and that the feed hose is unchanged in position relative to the lower arm member or the upper arm member in the direction of the clearance between the feed hose and the lower arm member or the upper arm member, the feed hose is mounted to the lower arm member or the upper arm member with the fastener.

In this way, the arrangement position of the feed hose is substantially the same as the longitudinal direction of the lower arm member or the longitudinal direction of the upper arm member, and the predetermined clearance between the lower arm member or the upper arm member and the feed hose is unchanged. Thus, the feed hose is not displaced, for example, by a centrifugal force at the time of moving the welding machine, and hence is prevented, for example, from coming into contact with adjacent members. The feed hose extending from the parts-feed source such as a parts feeder may have a distance of 10 m or more between the parts feeder and the welding machine. However, even when the feed hose extends over such a long distance, a space for moving the feed hose with a moving operation of the robot device can be sufficiently secured, and hence the feed hose is allowed to smoothly follow the upward turning, the downward turning, the rightward turning, and the leftward turning of the welding machine. Meanwhile, when the feed hose is mounted to the welding machine, the feed hose is liable to come into contact, for example, with the lower arm member or the upper arm member, or a mounting structure section of the parts-feeding device. According to the present invention, the relative position of the feed hose and the lower arm member or the upper arm member is unchanged as described above. Thus, the above-mentioned problem of the contact is solved.

The feed hose is mounted to the lower arm member or the upper arm member with the fastener. Thus, the feed hose can be arranged in a predetermined posture without coming into contact, for example, with the parts-feeding device and the mounting structure section in the vicinity of the lower arm member or the upper arm member. With this, the feed hose can be prevented from interfering with the complicated adjacent structural portions. In other words, the feed hose can be immovably arranged as part of the welding machine. Further, the feed hose can be freely deformed, for example, into a curved shape or a twisted shape between the welding machine and the parts-feed source.

In addition, the parts-feeding device and the mounting structure section therefor are collectively assembled to the lower arm member or the upper arm member. Thus, when the feed hose is mounted to the lower arm member or the upper arm member at such a collective assemblage position, a group of the welding machine comprising the parts-feeding device is compactified.

The feed hose is arranged within the space along the lower arm member or the upper arm member. The horizontal width of this space is set equal to the clearance between the lower arm member or the upper arm member and the outer part of the parts-feeding device. In other words, for example, when the welding machine is advanced by the robot device, the feed hose is arranged in a space behind the parts-feeding device. Thus, the feed hose is located behind the parts-feeding device, and the parts-feeding device functions to protect the feed hose. With this, at the time of moving the welding machine, the feed hose does not come into contact with the adjacent members, and hence can be prevented from being damaged.

The vertical width of the above-mentioned space is set equal to the clearance between the lower arm member or the upper arm member and the outer part of the mounting structure section. In other words, for example, when the welding machine is advanced by the robot device, the feed hose is located within a composite space formed of a rear space of the parts-feeding device as viewed in the horizontal direction, and a rear space between the lower arm member or the upper arm member and the outer part of the mounting structure section as viewed in the vertical direction. In other words, the feed hose is arranged within an imaginary space having the horizontal width and the vertical width. Thus, when the welding machine is advanced, the feed hose is located behind the parts-feeding device and the mounting structure section, and hence is prevented from coming into contact with the adjacent members.

BRIEF DESCRIPTION OF DRAWINGS

FIG. 5A is a plan view for illustrating an entirety of a parts-feeding device.

FIG. 5B is a plan view for illustrating an intermediate bracket of FIG. 5A.

FIG. 5C is a sectional view taken along the line C-C of FIG. 5A.

FIG. 5D is a sectional view similar to FIG. 5C.

FIG. 5E is a sectional view taken along the line E-E of FIG. 5A.

FIG. 6A is a side view for illustrating an entirety of the parts-feeding device.

FIG. 6B is a side view for illustrating an insertion driver of FIG. 6A.

DESCRIPTION OF EMBODIMENTS

A welding apparatus according to embodiments of the present invention is described.

First Embodiment

FIG. 1 to FIG. 9 are illustrations of a first embodiment of the present invention.

First, a projection bolt is described.

In the first embodiment to a third embodiment, target parts are projection bolts. However, the present invention is applicable also to projection nuts, other shaft-like parts, and other hollow parts. In the following description, the projection bolt may be simply referred to as a bolt.

Figure 9:
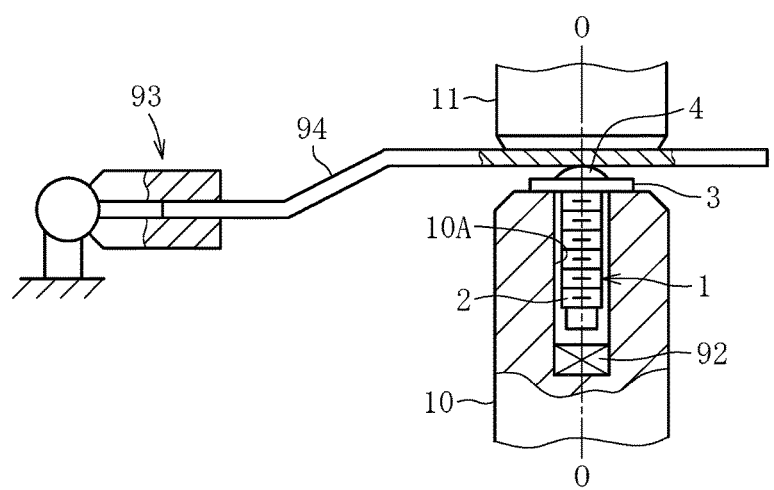
FIG. 9 is a sectional view for illustrating a state of welding a bolt.

As illustrated in FIG. 9, a projection bolt made of iron is denoted by reference symbol 1. The projection bolt 1 comprises a shaft portion 2 having male threads formed therearound, a circular flange portion 3 formed integrally with the shaft portion 2, and a welding projection 4 formed at a central portion of a surface of the flange portion on a side opposite to that of the shaft portion 2. The welding projection 4 may comprise a plurality of circumferentially arranged small projections.

The bolt 1 has the following dimensions. The shaft portion 2 has a diameter of 6 mm and a length of 24 mm. The flange portion 3 has a diameter of 12 mm and a thickness of 1.1 mm. The welding projection 4 has a diameter of 6.5 mm and a swelling height of 1 mm.

Next, an overall structure of the apparatus is described.

A welding machine 5 comprises a lower arm member 6 and an upper arm member 7. In the lower arm member 6, an elongated high-rigidity portion 6A formed so as to have a high rigidity through casting or other processing, and a thin electrode bar 6B formed through machining or other processing are integrated with each other through intermediation of a joint portion 8. The high-rigidity portion 6A is made of a copper alloy such as brass. Further, the electrode bar 6B is also made of a copper alloy such as chromium copper. In the upper arm member 7, an elongated high-rigidity portion 7A formed so as to have a high rigidity through casting or other processing, and a thin electrode bar 7B formed through machining or other processing are integrated with each other through intermediation of a joint portion 9. The high-rigidity portion 7A is made of a copper alloy such as brass. Further, the electrode bar 7B is also made of a copper alloy such as chromium copper. A center line (axial line) of the lower arm member 6 is denoted by reference symbol X-X.

Further, instead of such a joint type in which the lower arm member 6 and the upper arm member 7 respectively comprise the electrode bars 6B and 7B joined thereto, there may be employed an integrated type having a thin distal end side without the joint portion 8 or 9. In this embodiment, the former joint type is described in detail.

On a distal end side of the electrode bar 6B, an electrode 10 is arranged to stand substantially in a vertical direction. Similarly, an electrode 11 is arranged also on a distal end side of the electrode bar 7B. As will be described below, the electrode 11 is configured to advance and retreat relative to the electrode 10. Thus, the electrode 11 is a movable electrode, and the electrode 10 is a fixed electrode. Conversely, the electrode 10 may serve as the movable electrode, and the electrode 11 may serve as the fixed electrode. Alternatively, both the electrodes 10 and 11 may be configured to advance and retreat relative to each other.

The lower arm member 6 and the upper arm member 7 are arranged in a posture of extending substantially in a horizontal direction. An end portion of the high-rigidity portion 6A on a side opposite to that of the electrode 10 is an upright proximal member 6C. An end portion of the high-rigidity portion 7A on a side opposite to that of the electrode 11 is a proximal member 7C extending downward. The proximal member 6C and the proximal member 7C are coupled to each other with a shaft 12 such that the upper arm member 7 is pivoted relative to the lower arm member 6. With this, the electrode 11 is allowed to advance and retreat.

Between a projection piece 6D of the proximal member 6C and a projection piece 7D of the proximal member 7C, a pneumatic cylinder 13 serving as a pivoter is arranged. The upper arm member 7 is pivoted by output of the pneumatic cylinder 13.

The welding machine 5 of a type in which the upper arm member 7 and the lower arm member 6 are coupled to each other with the shaft 12 as described above is generally referred to as an X-gun. Meanwhile, although illustration is omitted, the welding machine 5 of a type in which the proximal member 7C of the upper arm member 7 and the proximal member 6C of the lower arm member 6 are coupled integrally to each other is generally referred to as a C-gun. In a case of this C-gun, although illustration is omitted, a pneumatic cylinder is mounted to a distal end portion of the upper arm member 7 such that the electrode 11 is allowed to advance and retreat by output of this pneumatic cylinder.

Although illustration is schematic, a robot device 14 is, for example, of a general six-axis type, and coupled to the lower arm member 6. In conjunction with a movement of the robot device 14, the welding machine 5 is moved, for example, in upward and downward directions, rightward and leftward directions, and turning directions.

Additional description is made on the terms. The "welding machine" refers to a unit mainly comprising the upper arm member and the lower arm member each comprising an electrode, that is, refers to the X gun or the C gun. The "welding apparatus" refers to a comprehensive unit in which a parts-feeding device described below is mounted to the "welding machine," and the robot device is coupled to the "welding machine."

Next, a support member is described.

A support member 16 refers to a member having a function to allow a parts-feeding device 100 described below to be mounted to the lower arm member 6 or the upper arm member 7, and comprising a vertical member 16A and a horizontal member 16B. In this embodiment, the support member 16 is obtained by forming a bar member having a circular shape in cross-section into an L-shape. The vertical member 16A is arranged in a posture of extending substantially in the vertical direction, and the horizontal member 16B is arranged in a posture of extending substantially in the horizontal direction. Further, as laterally viewed in FIG. 1, the horizontal member 16B is arranged below the lower arm member 6.

Figure 1:
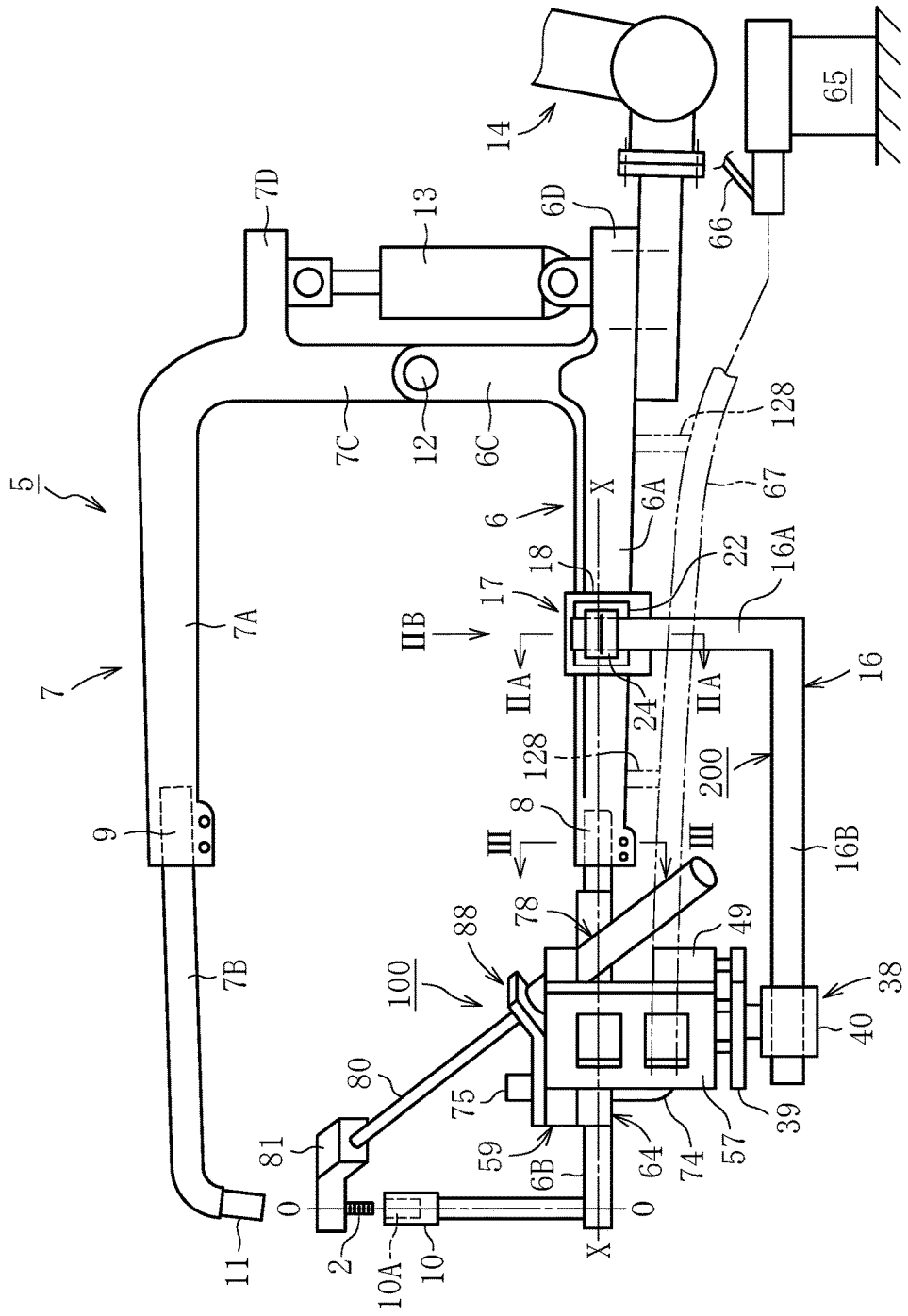
FIG. 1 is a schematic side view for illustrating an entirety of an apparatus.

In this embodiment, a case where the parts-feeding device 100 is mounted to the lower arm member 6 is exemplified. However, in a case where the parts-feeding device 100 is mounted to the upper arm member 7, the state of FIG. 1 is inverted upside down.

Next, a vertical member coupling portion is described.

Figure 2A:
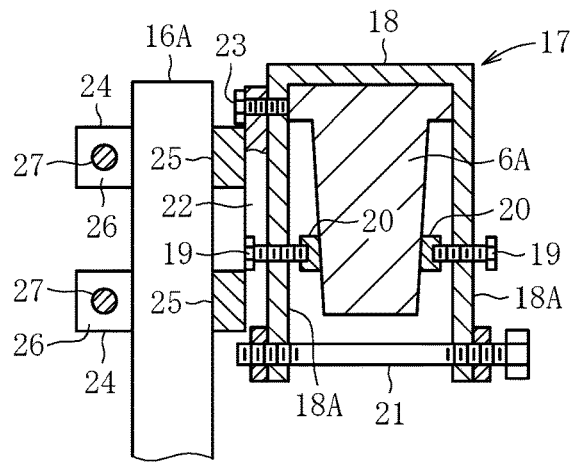
FIG. 2A is a sectional view taken along the line IIA-IIA of FIG. 1.
Figure 2B:
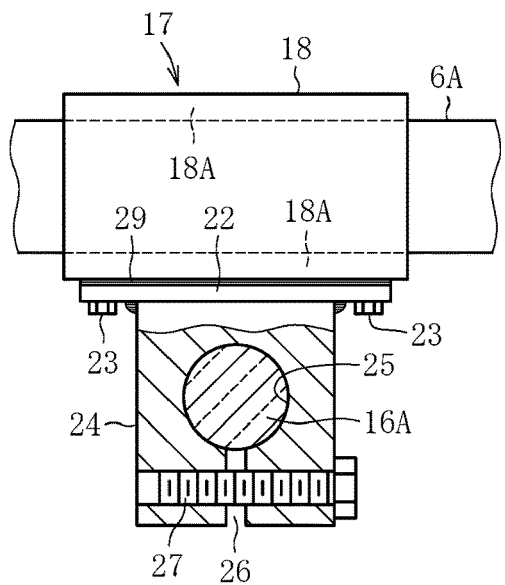
FIG. 2B is a sectional view taken along the line IIB-IIB of FIG. 1.
Figure 2C:
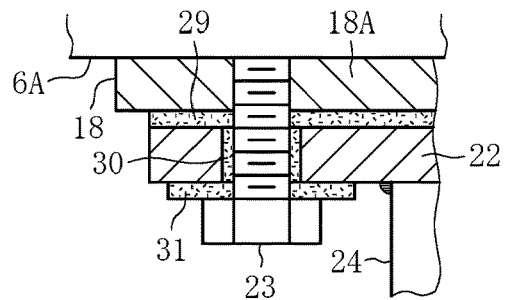
FIG. 2C is a sectional view for illustrating a periphery of a fixing bolt of FIG. 2B.

The vertical member 16A is coupled to the high-rigidity portion 6A through intermediation of a vertical member coupling portion 17. It is only necessary that this vertical member coupling portion 17 integrate the vertical member 16A and the high-rigidity portion 6A with each other. Herein, the structure as illustrated in FIG. 2A to FIG. 2C is provided. Specifically, the high-rigidity portion 6A is received in a body 18 having a substantially C-shape in cross-section to be opened downward. Pressure bolts 19 are screwed through double pieces 18A of the body 18. Pressure pieces 20 are pressed against both lateral side surfaces of the high-rigidity portion 6A by distal ends of the pressure bolts 19. With this, the body 18 is prevented from being inclined with respect to the high-rigidity portion 6A in the rightward and leftward directions in FIG. 2. Further, with a fastening bolt 21 screwed through a lower portion of the double pieces 18A of the body 18, the body 18 is coupled to the high-rigidity portion 6A. In other words, the body 18 is arranged under a state of being pressed against the high-rigidity portion 6A, and the vertical member is coupled to the high-rigidity portion 6A through intermediation of the body 18.

In order to integrate the vertical member 16A with the body 18, a quadrangular base plate 22 is fixed with fixing bolts 23 to one side of the double pieces 18A, and two clamping members 24 are welded to the base plate 22. The two clamping members 24 are arranged on an upper side and a lower side, and insertion holes 25 are formed therethrough in the vertical direction. Slits 26 are formed so as to communicate to the insertion hole 25, and fastening bolts 27 are screwed so as to act in a direction of reducing a clearance of each of the slits 26.

Under a state in which the fastening bolts 27 are loosened, the vertical member 16A is inserted into the insertion holes 25. Then, the fastening bolts 27 are fastened at an appropriate insertion position. With this, the vertical member 16A is firmly fastened by inner surfaces of the insertion holes 25. In this way, the vertical member 16A is mounted to the high-rigidity portion 6A. Thus, when the vertical member 16A is adjusted in position, an entirety of the parts-feeding device 100 can be moved and adjusted in the vertical direction.

A welding current is conducted through the lower arm member 6 or the upper arm member 7 having the parts-feeding device 100 mounted thereto. Thus, there is such a problem in that, when part of the parts-feeding device 100 comes into contact with an adjacent member with some cause, the current is conducted to that member, and sparks are generated from the contact part. In order to prevent such a problem, the base plate 22 is insulated from the body 18. An insulating plate 29 made of bakelite or other similar material is interposed between the one side of the double piece 18A, which corresponds to a lateral plate of the body 18, and the base plate 22. The fixing bolts 23 are each screwed through an insulating cylinder 30 made of similar material. An insulating washer 31 made of similar material is interposed between a head portion of each of the fixing bolts 23 and the base plate 22. Such an insulating structure prevents the welding current from flowing from the lower arm member 6 to the vertical member 16A.

Figure 8A:
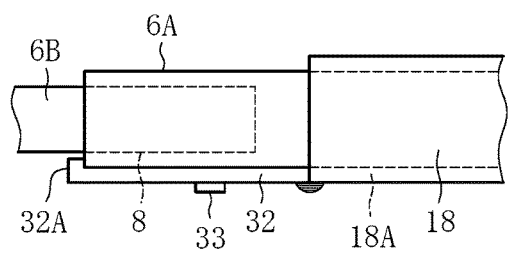
FIG. 8A is a plan view for illustrating a stopper structure.
Figure 8B:
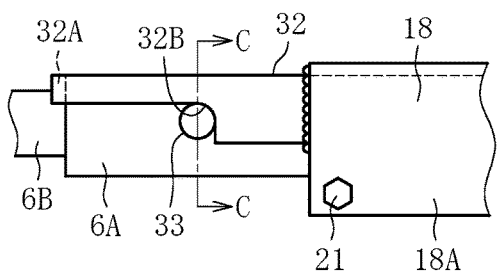
FIG. 8B is a bottom view for illustrating a stopper structure.
Figure 8C:
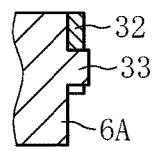
FIG. 8C is a sectional view taken along the line C-C of FIG. 8B.

The body 18 is prevented from being displaced also in a longitudinal direction of the high-rigidity portion 6A. This is illustrated in FIG. 8A to FIG. 8C. An elongated stopper member 32 is welded to a distal end of the body 18, and a hook portion 32A at a distal end of the stopper member 32 is hooked to a distal end surface of the high-rigidity portion 6A. With this, the body 18 is prevented from being moved to the right in FIG. 8A and FIG. 8B. Further, an engagement surface 32B formed at a central portion of the stopper member 32 abuts against a projection 33 formed on the lateral side surface of the high-rigidity portion 6A. With this, the body 18 is prevented from being moved to the left in FIG. 8A and FIG. 8B.

Next, a joint portion is described.

Figure 3:
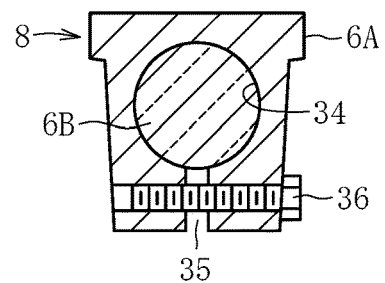
FIG. 3 is a sectional view taken along the line of FIG. 1.

The high-rigidity portion 6A and the electrode bar 6B, or the high-rigidity portion 7A and the electrode bar 7B are joined to each other at the joint portion 8 and the joint portion 9. Various specific structures therefor may be employed. In this embodiment, so-called insertion type is employed. As illustrated in FIG. 3 and FIG. 1, a longitudinal insertion hole 34 is formed through a distal end portion of the high-rigidity portion 6A, and a slit 35 is formed so as to communicate to the insertion hole 34 from outside. A fastening bolt 36 is screwed so as to function in a direction of reducing a clearance of the slit 35.

Under a state in which the fastening bolt 36 is loosened, the electrode bar 6B is inserted into the insertion hole 34. Then, the fastening bolt 36 is fastened. With this, the electrode bar 6B is firmly fastened by an inner surface of the insertion hole 34. In this way, the electrode bar 6B is joined to the high-rigidity portion 6A.

As described above, the vertical member 16A is coupled to the high-rigidity portion 6A or the high-rigidity portion 7A through intermediation of the vertical member coupling portion 17. With such structure, the vertical member 16A is coupled on the lower arm member 6 or the upper arm member 7 at a high-rigidity position which is away from the electrode 10 or the electrode 11.

Next, a horizontal member coupling portion is described.

The parts-feeding device 100 is mounted to the horizontal member 16B through intermediation of a horizontal member coupling portion 38. Thus, it is only necessary that the horizontal member coupling portion 38 be a mechanism providing such a function. In this embodiment, a joint member configured to couple the horizontal member 16B and a horizontal proximal member 39 being part of the parts-feeding device 100 to each other is employed.

Figure 4A:
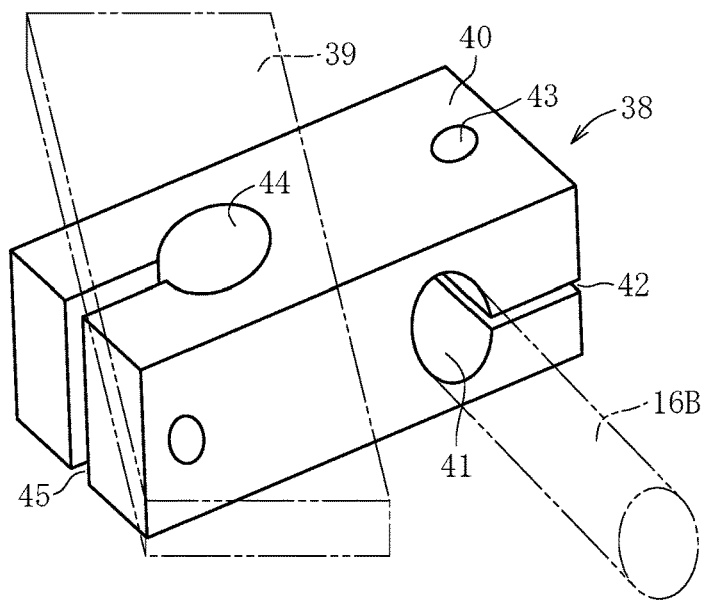
FIG. 4A is a three-dimensional view for illustrating a horizontal member coupling portion.
Figure 4B:
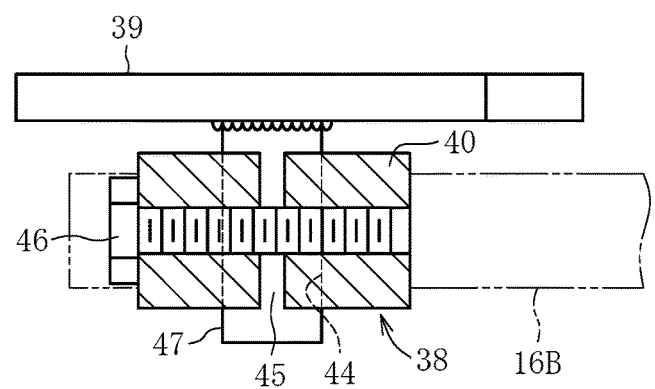
FIG. 4B is a partial sectional view for illustrating the horizontal member coupling portion.

As illustrated in FIG. 4A and FIG. 4B, an insertion hole 41 for allowing the horizontal member 16B to be inserted therethrough is formed through a body member 40 made of a block-like ferrous material having a rectangular-parallelepiped shape, and a slit 42 is formed so as to communicate to the insertion hole 41 from outside. A fastening bolt (not shown) is screwed into a threaded hole 43 so as to act in a direction of reducing a clearance of the slit 42.

Under a state in which the fastening bolt is loosened, the horizontal member 16B is inserted into the insertion hole 41. Then, the fastening bolt is fastened. With this, the horizontal member 16B is firmly fastened by an inner surface of the insertion hole 41. In this way, the horizontal member 16B is coupled to the body member 40.

Meanwhile, another insertion hole 44 is formed in a direction orthogonal to the insertion hole 41, and a slit 45 is formed so as to communicate to the insertion hole 44 from outside. A fastening bolt 46 is screwed into the body member 40 so as to act in a direction of reducing a clearance of the slit 45.

The horizontal proximal member 39 is obtained by forming a thick plate member made of stainless steel into a rectangular shape. A support shaft 47 formed of a rod member is welded to a central portion of the horizontal proximal member 39. The support shaft 47 is arranged in the vertical direction.

Under a state in which the fastening bolt 46 is loosened, the support shaft 47 is inserted into the insertion hole 44. Then, the fastening bolt 46 is fastened. With this, the support shaft 47 is firmly fastened by an inner surface of the insertion hole 44. In this way, the support shaft 47 is coupled to the body member 40. Thus, the horizontal proximal member 39 being a base member of the parts-feeding device 100 is coupled to the horizontal member 16B through intermediation of the body member 40.

In the manner as described above, the parts-feeding device 100 is mounted to the lower arm member 6. This "mounting structure section" is an assemblage of the support member 16, the vertical member coupling portion 17, and the horizontal member coupling portion 38 described above, and is denoted by reference symbol 200.

Next, the above-mentioned parts-feeding device is described.

A pneumatic cylinder 49 serving as an insertion driver is mounted to the horizontal proximal member 39. In this pneumatic cylinder 49, a piston rod 50 protruding downward is fixed to the central portion of the horizontal proximal member 39 such that, in conjunction with supply and exhaust of actuating air to and from a cylinder 51, a cylinder body 52 is advanced and retracted in the same direction as that of the electrode axial line O-O (see FIG. 1). By supplying and exhausting the actuating air alternately above and below a piston 53, the cylinder body 52 is advanced and retracted upward and downward. Note that, reference symbols 54 and 55 each represent an air supply and exhaust passage.

In order to smoothly advance and retract the cylinder body 52, two guide rods 56 are fixed to the horizontal proximal member 39. Those guide rods 56 are configured to slide through the cylinder body 52. With the above-mentioned configuration of the pneumatic cylinder 49, in conjunction with the supply and exhaust of the actuating air, under a state in which the piston rod 50 is stopped, the cylinder body 52 is advanced and retracted in the same direction as that of the electrode axial line O-O.

As illustrated in FIG. 1 and FIG. 6B, a vertical proximal member 57 is mounted, for example, with bolts to a lateral side surface of the cylinder body 52. The vertical proximal member 57 is formed of a thick plate member made of stainless steel having a rectangular shape, and has two upper and lower window portions 58 for weight reduction. The vertical proximal member 57 is extended upward in the vertical direction, and an intermediate bracket 59 is coupled, for example, with bolts to an upper end portion of the vertical proximal member 57.

The intermediate bracket 59 is formed through machining of an elongated block-like member. The intermediate bracket 59 comprises a body portion 60 adhered to the vertical proximal member 57, a projection portion 61 protruding from the body portion 60 in a width direction of the body portion 60, and a cutout portion 62 formed so as to secure an arrangement space for a bolt feeding unit described below. A stop-and-pass unit described below is mounted to a lower side of the projection portion 61, and the bolt feeding unit is mounted to an upper side of the projection portion 61. When the target parts are projection nuts, this bolt feeding unit is replaced with a nut feeding unit as described below.

Next, the above-described stop-and-pass unit is described.

An entirety of the stop-and-pass unit is denoted by reference symbol 64, and is configured to temporarily stop and then release the bolt 1 transferred at high speed from a parts feeder 65. With such a function, the bolt 1 is prevented from colliding at high speed against an inner end surface of a holding head described below. With this, abnormal deformation of a depth part of a recess portion of the head is prevented.

Figure 7:
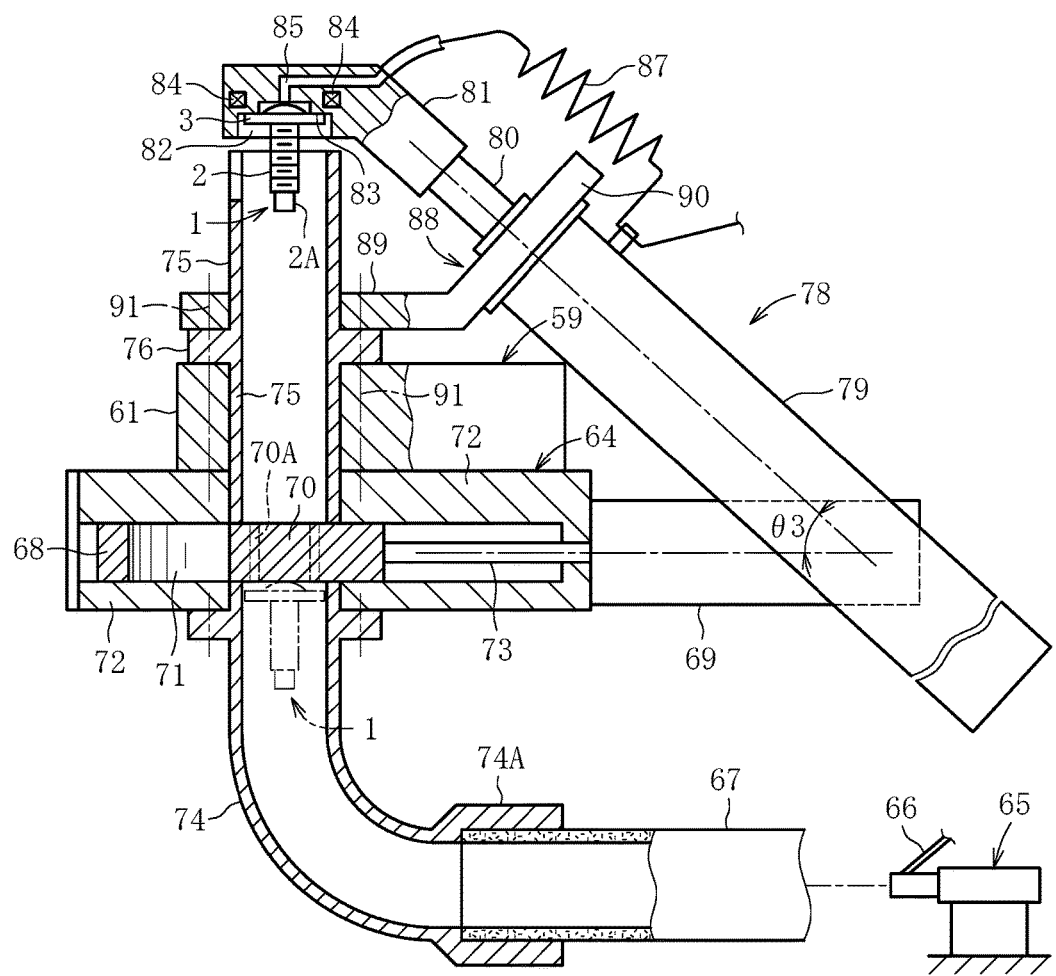
FIG. 7 is a sectional view for mainly illustrating a stop-and-pass unit.

Reference symbol 66 represents an air jet tube arranged so as to convey the bolt 1 with jetted air. As illustrated in FIG. 7, the air is jetted into a feed hose 67. The feed hose 67 is made of flexible synthetic resin materials such as a urethane resin and a polypropylene resin so as to be capable of following a movement of the robot device 14.

As illustrated in FIG. 7, the stop-and-pass unit 64 is formed into a shape having an elongated external appearance, and comprises an openable and closable member 68 of an advancing and retracting movement type configured at least to allow the bolt 1 to stop and pass, and an advancing and retracting stroker 69 for advancing and retracting the openable and closable member 68. The advancing and retracting stroker 69 comprises a pneumatic cylinder. The openable and closable member 68 is formed of an elongated block-like member, and comprises a solid stopper member 70 configured to temporarily stop the bolt 1 moved at high speed, and a passage hole 71. The openable and closable member 68 is received in an elongated case 72 so as to be capable of advancing and retracting therein, and is configured to be actuated to perform advancing and retracting operations by a pneumatic cylinder 69 fixed to an end portion of the case 72. Reference symbol 73 represents a piston rod configured to transmit the advancing and retracting operations to the openable and closable member 68. With such a configuration, as described above, the entirety of the stop-and-pass unit 64 has the elongated shape.

Further, vents 70A are formed through the stopper member 70 at positions thereon. With this, the conveying air from the air jet tube 66 is allowed to flow so as to transfer the bolt 1. Further, a dynamic pressure of the conveying air is applied to a subsequent bolt 1 held in abutment against the stopper member 70 such that this bolt 1 is not moved back.

An inlet-side parts-feeding tube 74 and an outlet-side parts-feeding tube 75 are coaxial with each other and fixed to the case 72. The feed hose 67 is connected to the inlet-side parts-feeding tube 74. Further, a spacer flange 76 having a sufficient thickness in a longitudinal direction of the outlet-side parts-feeding tube 75 is formed around the outlet-side parts-feeding tube 75. A lower side of the spacer flange 76 passes through the projection portion 61 of the intermediate bracket 59, and an upper side of the spacer flange 76 passes through an inclined mounting member described below.

As illustrated in FIG. 5A, a longitudinal direction of the stop-and-pass unit 64 having an elongated shape is parallel to the lower arm member 6. The inlet-side parts-feeding tube 74 and the feed hose 67 are extended along the lower arm member 6 to reach the parts feeder 65. When the stop-and-pass unit 64, the inlet-side parts-feeding tube 74, the feed hose 67, and other components are extended along the lower arm member 6 in this way, compactification of an entirety of the apparatus is promoted. In addition, with the arrangement of long members such as the feed hose 67 along the lower arm member 6, even when the welding machine 5 is oriented in various directions by the robot device 14, the feed hose 67 can be prevented from interfering with adjacent members.

As illustrated particularly in FIG. 5A, FIG. 6A, and FIG. 6B, the stop-and-pass unit 64, the inlet-side parts-feeding tube 74, the feed hose 67, and other components are extended along the lower arm member 6. In addition, in plan view, the feed hose 67 is arranged within a clearance width between the lower arm member 6 and a lower end of a bolt feeding unit 78 (lower end of a pneumatic cylinder 79), and extended within this clearance width toward the right in FIG. 5A. Thus, even when the welding machine 5 is oriented in the various directions by the robot device 14, the feed hose 67 can be prevented from interfering with adjacent members.

The expression "in plan view" in this specification and in claims represents a view of the lower arm member 6 as viewed from right above in the vertical direction under a state in which the vertical member 16A is arranged in the vertical direction with respect to the lower arm member 6 arranged in the horizontal direction.

Although illustration is omitted, the structure for arrangement of the feed hose 67 in such a manner may be practiced, for example, by holding the feed hose 67 extending along the lower arm member 6 to a position near a right end of the lower arm member 6 in the illustration of FIG. 1 through use of a holding fitting. The state in which the feed hose 67 is arranged parallel to the lower arm member 6 is illustrated in FIG. 5A.

Next, the above-mentioned bolt feeding unit is described.

An entirety of the bolt feeding unit is denoted by reference symbol 78, and mainly comprises the long pneumatic cylinder 79 serving as an advancing and retracting driver, a feed rod 80 configured to be advanced and retracted by the pneumatic cylinder 79, and a holding head 81 arranged at a distal end portion of the feed rod 80. The bolt feeding unit 78 is formed into a shape having an elongated external appearance which allows the pneumatic cylinder 79 to move the bolt 1, which is held by the holding head 81, from the outlet-side parts-feeding tube 75 of the above-mentioned stop-and-pass unit 64 to the electrode 10. In other words, the bolt feeding unit 78 has the elongated shape because it needs to feed the bolt 1 to a distant position.

As illustrated in FIG. 7, the holding head 81 has a circular recess portion 82 opened downward such that the flange portion 3 of the bolt 1 is seated on an inner end surface 83 at a depth of the recess portion 82. An attractive force necessary for seating the flange portion 3 is secured by permanent magnets 84 embedded in the holding head 81.

Under a state in which the feed rod 80 is advanced, the shaft portion 2 of the bolt 1 seated on the inner end surface 83 is coaxial with the electrode axial line O-O. Thus, in the holding head 81, the shaft portion 2 is held in the upward and downward directions, that is, the vertical direction.

An air passage 85 is opened at the depth of the recess portion 82. With this, when a distal end portion 2A of the shaft portion 2 has slightly entered a receiving hole 10A of the electrode 10, air is jetted to allow the bolt 1 to be advanced to a depth of the receiving hole 10A. A coiled expandable hose 87 capable of expanding and contracting in conjunction with advancement and retraction of the holding head 81 connects an air source (not shown) and the air passage 85 to each other.

The above-mentioned inclined mounting member 88 arranged on the above-mentioned spacer flange 76 is obtained by forming a bent member with a thick plate-like member. Specifically, a fixing portion 89 in a horizontal state and an inclined portion 90 having an inclination form a V-shape. The pneumatic cylinder 79 is mounted to the inclined portion 90. An inclination angle of the inclined portion 90 is selected, to thereby determine an inclination angle of the feed rod 80. The inclination angle of the feed rod 80 is equal to an angle between a horizontal line (center line X-X, see FIG. 6A) and an axial line of the feed rod 80. This inclination angle is denoted by reference symbol θ3, which is 45 degrees in this embodiment. As illustrated in FIG. 7, the fixing portion 89, the spacer flange 76, the projection portion 61, and the case 72 that allow the outlet-side parts-feeding tube 75 to pass therethrough are integrated with each other with coupling bolts screwed at the positions indicated by the two-dot chain lines. Four coupling bolts are illustrated in FIG. 5A and denoted by reference symbol 91 in the illustration of FIG. 5A.

As described above, the parts-feeding device 100 comprises the horizontal proximal member 39 fixed to the horizontal member 16B, the pneumatic cylinder 49 serving as the insertion driver that is coupled to the horizontal proximal member 39 and configured to generate output for advancement and retraction in the vertical direction, the vertical proximal member 57 being mounted to the insertion driver 49 and extending upward in the vertical direction, the intermediate bracket 59 coupled to the upper portion of the vertical proximal member 57, the stop-and-pass unit 64 mounted to a lower side of the intermediate bracket 59 and configured to temporarily stop and then release the fed bolt 1, and the bolt feeding unit 78 mounted to an upper side of the intermediate bracket 59 and comprising the feed rod 80 of the advancing and retracting movement type. The horizontal proximal member 39, the pneumatic cylinder 49, the vertical proximal member 57, the intermediate bracket 59, the stop-and-pass unit 64, the bolt feeding unit 78, and other components are referred to as "components" of the parts-feeding device 100.

Next, a state of welding the bolt is described.

FIG. 9 is a view for illustrating a state of welding the bolt 1. The above-mentioned receiving hole 10A is formed in the electrode 10, and a permanent magnet 92 configured to attract the bolt 1 is arranged at the depth of the receiving hole 10A. The bolt 1 is attracted by the permanent magnet 92, and hence the bolt 1 is prevented from being easily dropped by the movements of the robot device 14, for example, in the upward and downward directions, the rightward and leftward directions, and the turning directions.

A steel plate workpiece 94 held by a clamping mechanism 93 and the bolt 1 are pressurized by both the electrodes 10 and 11. When the welding current is conducted in this state, the welding projection 4 is welded to the steel plate workpiece 94.

Next, a protective structure of the parts-feeding device is described.

On the outside of the parts-feeding device 100, members configured to protect, for example, the units constructing the parts-feeding device 100 are arranged. As illustrated in the plan view of FIG. 5A, the vertical proximal member 57 and the lower arm member 6 correspond to the members configured to exert a protective function. Meanwhile, as illustrated in the plan view of FIG. 5A, main components of the parts-feeding device 100, which are arranged between the vertical proximal member 57 and the lower arm member 6, correspond to members to be protected.

Those main components comprise the horizontal proximal member 39 fixed to the horizontal member 16B, the pneumatic cylinder 49 serving as the insertion driver that is coupled to the horizontal proximal member 39 and configured to generate the output for advancement and retraction in the vertical direction, the vertical proximal member 57 mounted to the insertion driver 49 and extending upward in the vertical direction, the intermediate bracket 59 coupled to the upper portion of the vertical proximal member 57, the stop-and-pass unit 64 mounted to the lower side of the intermediate bracket 59 and configured to temporarily stop and then release the fed projection bolt 1, and the bolt feeding unit 78 mounted to the upper side of the intermediate bracket 59 and comprising the advancing and retracting movement type feed rod 80. In this embodiment, the vertical proximal member 57 being part of the parts-feeding device 100 serves as a protective member. Alternatively, as described below, a member dedicated for the protective function may be arranged.

As is apparent from FIG. 5A, the vertical proximal member 57 is arranged in a posture of extending in the vertical direction, and a gap between the vertical proximal member 57 and the lower arm member 6 forms a wedge-shaped space narrowed on the electrode 10 side. A narrow angle θ2 formed between the lower arm member 6 and the vertical proximal member 57 in plan view is 35 degrees. As is apparent from FIG. 5A, the bolt feeding unit 78 is parallel to the vertical proximal member 57. Therefore, a narrow angle formed between the bolt feeding unit 78 and the lower arm member 6 is also θ2.

Thus, the bolt feeding unit 78 is inclined in two directions with the angle θ3 and the angle θ2 with respect to the center line X-X. As illustrated in FIG. 5A, the vertical proximal member 57 is arranged parallel to the bolt feeding unit 78 inclined in this way. Thus, the vertical proximal member 57 and the lower arm member 6 are arranged in a V-shape narrowed on the electrode 10 side. In other words, the arrangement and the posture of the bolt feeding unit 78 are utilized to arrange the vertical proximal member 57 and the lower arm member 6 in a V-shaped positional relationship.

At the time of advancing the electrode 10 side of the welding machine 5 toward the steel plate workpiece 94 in conjunction with the movement of the robot device 14, when, for example, a malfunction of the robot device 14 occurs, the parts-feeding device 100 may come into contact with the adjacent members. In such a case, the above-mentioned main components of the parts-feeding device 100 are arranged between the vertical proximal member 57 and the lower arm member 6, and hence the vertical proximal member 57 and the lower arm member 6 come into contact with the adjacent members as with protectors. With this, the above-mentioned main components themselves do not come into contact with the adjacent members, and hence damage to the components of the apparatus can be prevented.

The window portions 58 are formed through the vertical proximal member 57 for weight reduction. However, when a foreign matter therearound may enter through the window portions 58, it is desired that the window portions 58 be reduced in size, or the window portions 58 be omitted.

Further, in order to enhance the protective function of the vertical proximal member 57, as indicated by the two-dot chain lines in FIG. 5A and FIG. 6A, it is desired that, for example, an extended portion 95 and a bent portion 96 be formed by extending the electrode 10 side of the vertical proximal member 57 toward the electrode 10.

Next, arrangement of the components of the parts-feeding device is described.

In plan view, the components of the parts-feeding device 100 comprise the vertical proximal member 57 serving as the protective member or one of a protective plate 101 and bar members 102 that are coupled to the above-mentioned mounting structure section 200 and serve as the protective member, the intermediate bracket 59 coupled to the upper portion of the vertical proximal member 57, the bolt feeding unit 78 or a nut feeding unit 78A fixed to the intermediate bracket 59, the stop-and-pass unit 64 coupled to the intermediate bracket 59 and configured to temporarily stop and then release or a feeding tube 110 configured to introduce nuts, and the feed hose 67 configured to allow the bolts or the nuts to be fed to the bolt feeding unit 78 or the nut feeding unit 78A. Those components are arranged in the order of the protective member 57, 101, or 102, the intermediate bracket 59, the bolt feeding unit 78 or the nut feeding unit 78A, the feed hose 67, and the lower arm member 6 or the upper arm member 7 from the protective member side.

Next, the mounting structure for the feed hose is described.

The feed hose 67 extends from the parts feeder 65 serving as a parts-feed source toward the parts-feeding device 100, and is connected to the inlet-side parts-feeding tube 74 as illustrated in FIG. 1 and FIG. 7. At this connecting portion, the feed hose 67 is pushed into an insertion portion 74A formed at an end portion of the inlet-side parts-feeding tube 74. As described above, the feed hose 67 is made of the flexible synthetic resin materials such as a urethane resin and a polypropylene resin so as to be flexible and capable of following the moving operation of the robot device 14. Further, the feed hose 67 is formed into a circular shape in cross-section.

When the steel plate workpiece 94 to be subjected to welding of the bolt 1 is as large as an automotive floor panel, a length of each of the lower arm member 6 and the upper arm member 7 of the welding machine 5 is set to from 1 m to 1.5 m. The welding machine 5 having such a large size performs moving operation, and hence the parts feeder 65 is installed at a position as much as from 5 m to 10 m away from the welding machine 5. Thus, in consideration of amounts of curvature and deformation of the feed hose 67, a length of the feed hose 67 is set to 10 m or more.

The length of the feed hose 67 from the parts feeder 65 to the welding machine 5 can be set to a length that is sufficient to follow the moving operation of the welding machine 5. However, the feed hose 67 extended to the welding machine 5 and assembled to the welding machine 5 needs to be arranged so as not to come into contact with adjacent members such as the lower arm member 6, the parts-feeding device 100, and the mounting structure section 200. Further, in order to enhance durability of the feed hose 67, it is important to prevent the feed hose 67, for example, from being excessively and repeatedly bent.

From such viewpoints, in order that the feed hose 67 is extended in a direction substantially the same as a longitudinal direction of the lower arm member 6, and is unchanged in position relative to the lower arm member 6 in a direction of a clearance between the feed hose 67 and the lower arm member 6, the feed hose 67 is mounted to the lower arm member 6 with fasteners 128. In other words, the clearance between the lower arm member 6 and the feed hose 67 is set to a predetermined clearance. The fasteners 128 provide such a function. Thus, various structures such as the structure obtained by coupling a tube member configured to hold the feed hose to a rod member, and a band member configured to be wrapped around the lower arm member 6 may be employed as the fasteners 128.

In this embodiment, the following structure is employed. FIG. 5C is a sectional view taken along the line C-C of FIG. 5A. The fastener 128 illustrated in this sectional view comprises a fixing portion 129 opened upward such that a lower portion of the high-rigidity portion 6A is inserted thereinto, a fixing bolt 130 screwed into the fixing portion 129 and pressed against the high-rigidity portion 6A, and a holding piece 131 welded to the fixing portion 129. This holding piece 131 is formed of an elongated belt-like steel plate, and comprises a holding portion 132 curved into a circular shape such that the feed hose 67 is passed therethrough without a gap. Reference symbol 133 represents a non-slip serration 133.

In the fastener 128 illustrated in FIG. 5D, the holding piece 131 is fixed with a fixing bolt 134 directly to the high-rigidity portion 6A.

FIG. 5E is a sectional view taken along the line E-E of FIG. 5A. In the fastener 128 illustrated in FIG. 5E, the holding piece 131 is coupled to a fixing band 135 integrated with the high-rigidity portion 6A under a state of surrounding the high-rigidity portion 6A. Reference symbol 136 represents a fixing bolt configured to fix the fixing band 135 to the high-rigidity portion 6A.

The fasteners 128 illustrated in FIG. 5C to FIG. 5E each commonly comprise the holding piece 131. A length or a bent shape of the holding piece 131 is selected so that the arrangement position of the feed hose 67 can be selected.

In FIG. 1, the outlines of the components are complicated, and hence the feed hose 67 and the fastener 128 are schematically illustrated by the two-dot chain lines. Further, the feed hose 67 is mounted to the lower arm member 6 with the fasteners 128. However, the feed hose 67 can also be mounted to the vertical member 16A with a larger number of the fasteners 128.

Next, the arrangement position of the feed hose is described.

The feed hose 67 is arranged within a space along the lower arm member 6. As illustrated in the plan view of FIG. 5A, a horizontal width of this space is equal to a distance W1 between the lower arm member 6 and an outer part 137 of the parts-feeding device 100. The outer part 137 corresponds to an outer corner part of the vertical proximal member 57. Meanwhile, as illustrated in the side view of FIG. 6A, a vertical width of the space is equal to a distance W2 between the lower arm member 6 and an outer part 138 of the above-mentioned mounting structure section 200. This outer part 138 corresponds to a lower end portion of the support shaft 47.

As described above, the feed hose 67 is arranged within an elongated imaginary space having the horizontal width W1 and the height W2. With this, the feed hose 67 is arranged in the direction substantially the same as the longitudinal direction of the lower arm member 6. Thus, in part of the welding machine 5, the feed hose 67 is positioned within the above-mentioned space, and is prevented from coming into contact with the adjacent members such as the lower arm member 6, the support member 16, and the parts-feeding device 100. Further, for example, when the welding machine 5 is advanced, the feed hose 67 is protected by being positioned behind the parts-feeding device 100 and the mounting structure section 200, thereby being prevented from coming into contact with the adjacent members.

Next, adjustment at the time of mounting the apparatus is described.

This adjustment is performed such that, under the state in which the feed rod 80 is maximally advanced, the bolt 1 held by the holding head 81 is coaxial with the electrode axial line O-O, and a distal end of the bolt 1 is positioned close to the electrode 10. For this adjustment, in the vertical member coupling portion 17, a position of the vertical member 16A relative to the lower arm member 6 in the vertical direction is specified. Simultaneously, the horizontal member 16B is displaced in a pivotal direction about the vertical member 16A. Further, the parts-feeding device 100 is, for example, moved in the horizontal direction by adjusting the horizontal member coupling portion 38, or turned by turning the horizontal proximal member 39 about the support shaft 47. Those adjustment operations are repeated to align the bolt 1 with the electrode axial line O-O, as described above.

Next, an operation of the apparatus is described.

The bolt 1 delivered at high speed from the parts feeder 65 is caught by the stopper member 70 of the stop-and-pass unit 64. Then, the openable and closable member 68 is moved in conjunction with actuation of the pneumatic cylinder 69 such that the passage hole 71 is coaxial with the outlet-side parts-feeding tube 75. With this, the air flow continuously jetted through the air jet tube causes the bolt 1 to be held at low speed by the holding head 81. In this way, an impact to the holding head 81 is reduced. As illustrated in FIG. 7, in this state, the orientation of the shaft portion 2 is parallel to the vertical direction. Under a state in which the bolt 1 is held by the holding head 81 in this way, the cylinder body 52 of the pneumatic cylinder 49 is located at a highest position.

Next, the feed rod 80 is advanced in conjunction with actuation of the pneumatic cylinder 79, and is stopped at a position where the shaft portion 2 is coaxial with the electrode axial line O-O as illustrated in FIG. 1. When the cylinder body 52 of the pneumatic cylinder 49 is lowered in this state, the stop-and-pass unit 64 and the bolt feeding unit 78 are lowered integrally with each other. Then, the cylinder body 52 is stopped being lowered at a position where the distal end portion 2A of the bolt 1 enters the vicinity of an inlet of the receiving hole 10A.

After that, when the air is jetted through the air passage 85, thrust by this jet exceeds an attractive force of the permanent magnets 84. With this, the bolt 1 is inserted into the receiving hole 10A, and then receives an attractive force of the permanent magnet 92 so as not to be disengaged from the receiving hole 10A. Then, an operation of feeding the bolt 1 is completed.

Subsequently to the completion of the above-mentioned feeding operation, the operation is performed in the reverse order. With this, the holding head 81 is returned to the position close to the outlet-side parts-feeding tube 75, and waits for arrival of a subsequent bolt 1.

After the bolt 1 is fed to the electrode 10 in such a manner, the robot device 14 is operated and stopped at a position corresponding to a predetermined position on the steel plate workpiece 94. Next, the pneumatic cylinder 13 is actuated such that, as illustrated in FIG. 9, the steel plate workpiece 94 and the welding projection 4 are pressurized between both the electrodes 10 and 11, and the welding current is conducted. With this, the welding is completed.

Illustration of air inlet and exhaust tubes for the actuating air to the above-mentioned pneumatic cylinders is omitted. Instead of the above-mentioned various pneumatic cylinders, there may be employed electric motors configured to generate the output for advancement and retraction. Further, the above-mentioned various permanent magnets may be replaced with electromagnets.

The above-mentioned operations, such as the advancing and retracting operations of the feed rod, and the air jet, can be easily performed through generally employed control methods. When air switching valves configured to be activated by signals from a control apparatus or a sequential circuit, sensors configured to generate signals at predetermined positions of the pneumatic cylinders and transmit those signals to the control apparatus, and other components are used in combination with each other, predetermined operations can be reliably performed.

Functions and effects of the first embodiment described above are as follows.

The support member 16 has the following functions and effects.

In the parts-feeding device 100, typically, the mechanisms such as the feed rod 80 comprising the holding head 81, the pneumatic cylinder 79 serving as the advancing and retracting driver configured to advance and retract the feed rod 80, and the pneumatic cylinder 49 that serves as the insertion driver configured to cause the bolt 1 to be held in the receiving hole 10A of the electrode 10 are unified and have a predetermined mass. In order to mount the parts-feeding device 100 to the welding machine 5, a mounting strength with respect to the lower arm member 6 needs to be sufficiently secured. At the same time, the parts-feeding device 100 has its own size, and hence the parts-feeding device 100 needs to be arranged close to the electrode 10 when the lower arm member 6 is long. Further, it is important that the parts-feeding device 100 and the electrode 10 that receives the bolt 1 to be fed thereto be adjusted in their relative positions with accuracy and through simple work. In addition, in view of simplification of maintenance, it is important to provide the structure that allows removal of only the electrode 10 or only the parts-feeding device 101 when the welding apparatus is to be overhauled.

The parts-feeding device 100 configured to feed the projection bolt 1, which is to be welded to the steel plate workpiece 94, to the electrode 10 is mounted to the horizontal member 16B. The vertical member 16A is mounted to the high-rigidity portion 6A on the lower arm member 6 at a position which is away from the electrode 10.

By the various movements of the robot device 14, such as the rightward turning, the leftward turning, the upward turning, and the downward turning, a high inertial load is applied at the position on the lower arm member 6, to which the parts-feeding device 100 is coupled. However, as described above, the vertical member 16A is mounted to the high-rigidity portion 6A of the arm. Thus, a large inertial force is applied to the high-rigidity portion 6A, and hence problems such as insufficient coupling strength at this coupling portion do not occur. With this, a mounting rigidity of the parts-feeding device 100 can be reliably secured.

In other words, with use of the support member 16 comprising the vertical member 16A and the horizontal member 16B, the parts-feeding device 100 need not be mounted to the above-mentioned electrode bar 6B. Thus, deformation of the electrode bar 6B, or displacement in relative position of both the electrodes 10 and 11 can be prevented. When such displacement occurs, the projection bolt 1 is displaced from the electrode axial line O-O. As a result, proper conduction of the welding current to the projection bolt 1 may be interfered, and hence failures in welding occur. Further, when the parts-feeding device 100 is mounted to the electrode bar 6B, the inertial load of the parts-feeding device 100 is applied to the joint portion 8 at which the electrode bar 6B is joined to the high-rigidity portion 6A. As a countermeasure, a joint structure of the joint portion 8 needs to be reinforced so as to have a sufficient joint strength. As a result, problems such as complication of the structure and increase in weight occur, and hence compactification of the welding apparatus may become more difficult. The configuration described above is free from such problems because it has the structure which is dependent on the high-rigidity portion 6A.

The operations such as moving the parts-feeding device 100 in the horizontal direction along the horizontal member 16B, and moving the parts-feeding device 100 in the vertical direction along the vertical member 16A can be easily performed. Thus, the parts-feeding device 100 can be easily arranged close to the electrode 10.

Further, the support member 16 comprises the vertical member 16A and the horizontal member 16B. Thus, through the position adjustment along the vertical member 16A and the position adjustment along the horizontal member 16B, a mounting position of the parts-feeding device 100 can be easily adjusted.

The support member 16 comprising the vertical member 16A and the horizontal member 16B can be formed into a structurally simple shape. Thus, a rigidity of the support member 16 itself can be easily set high. Therefore, a coupling rigidity can be sufficiently secured at the time of indirectly coupling the parts-feeding device 100 to the high-rigidity portion 6A through intermediation of the support member 16. In particular, when a phenomenon of deformation of the support member 16 occurs due to the movements of the robot device 14, the bolt 1 cannot be accurately fed to the electrode 10. However, such a problem can be prevented by the support member 16 having the high rigidity.

The parts-feeding device 100 is coupled to the high-rigidity portion 6A through intermediation of the vertical member 16A. Meanwhile, the electrode 10 is mounted to the electrode bar 6B joined to the high-rigidity portion 6A. Thus, at the time of maintenance for the electrode bar 6B and the electrode 10, while leaving the parts-feeding device 100 on the high-rigidity portion 6A side, the electrode bar 6B can be handled by being removed from the high-rigidity portion 6A. Further, at the time of maintenance for the parts-feeding device 100, while leaving the electrode 10 and the electrode bar 6B, the vertical member 16A can be removed from the high-rigidity portion 6A to perform the maintenance only for the parts-feeding device 100. In this way, maintenance can be independently performed only for necessary components. Thus, unnecessary removal of components is not performed, and hence it is effective for enhancing workability.

At the proximal portion 6C formed on the side opposite to that of the electrode 10, the lower arm member 6 is coupled so as to be openable and closable with the shaft 12. Alternatively, the lower arm member 6 and the upper arm member 7 may be coupled integrally to each other on the proximal portion 6C or 7C side, and the robot device 14 may be coupled in the vicinity of this coupling portion. In any of the cases, it is important to prevent application of an excessive load to the shaft structure part and the coupling part of the robot device. In this embodiment, the coupling position of the vertical member 16A can be brought closer to the coupling parts of the shaft 12 and the robot device 14. With this, the excessive load can be alleviated, and hence it is effective for enhancing durability of the entirety of the apparatus.

The vertical member 16A is mounted to the high-rigidity portion 6A such that vertical member 16A can be adjusted in position in the vertical direction. The parts-feeding device 100 is mounted to the horizontal member 16B such that the parts-feeding device 100 can be adjusted in position in the horizontal direction.

The entirety of the parts-feeding device 100 can be adjusted in position relative to the electrode 10 in the vertical direction by moving the vertical member 16A relative to the lower arm member 6 in the vertical direction. Further, the entirety of the parts-feeding device 100 can be adjusted in position relative to the electrode 10 in the horizontal direction by moving the entirety of the parts-feeding device 100 relative to the horizontal member 16B. In this way, position adjustment can be performed in the two directions including the vertical direction and the horizontal direction, and hence the relative position of the parts-feeding device 100 and the electrode 10 can be easily determined.

As illustrated in FIG. 2A to FIG. 2C, the high-rigidity portion 6A is received in the body 18 having the C-shape in cross-section, and, by the fastening bolt 21 screwed through the lower portion of the double piece 18A of the body 18, inner surfaces of the body 18 are pressed against outer surfaces of the high-rigidity portion 6A. In other words, without performing drilling, deformation processing, or other processing of the high-rigidity portion 6A at all, a necessary member (body 18) is mounted under a pressurized state to the high-rigidity portion 6A, and the clamping member 24 and other members are coupled to this member. Thus, at the time of mounting the parts-feeding device 100, even without performing drilling or the deformation processing of the high-rigidity portion 6A, reduction in rigidity and strength of the lower arm member 6 can be prevented. In this way, an original rigidity and an original strength of the off-the-shelf welding machine 5 can be maintained.

The functions and effects of the protective structure are as follows.

The parts-feeding device 100 is protected from both sides by the protective member being part of the parts-feeding device 100, that is, the vertical proximal member 57, and the lower arm member 6. Thus, with some cause such as a trouble in an actuation signal for the robot device 14, even when a movement trajectory of the welding apparatus is deviated from a normal movement trajectory to bring the parts-feeding device 100 into contact with adjacent members such as a bent part of the steel plate workpiece 94 and a machine frame configured to hold the steel plate workpiece 94, the parts-feeding device 100 can be protected from damage.

The parts-feeding device 100 is generally a device of an assemblage of components such as the feed rod 80 comprising the holding head 81, the advancing and retracting driver such as the pneumatic cylinder 79 configured to advance and retract the feed rod 80, the feed hose 67 configured to guide the bolt 1, and the insertion driver such as the pneumatic cylinder 49 configured to cause the bolt 1 to be held by the electrode 10. Those components are easily damaged when the welding apparatus is moved along an abnormal movement trajectory and, for example, collides against or comes into contact with the steel plate workpiece 94, the machine frame, or other components. However, by the protective function of the vertical proximal member 57 and the lower arm member 6 that serve as the protective members, damage to the components is prevented.

The components such as the feed rod 80 and the pneumatic cylinder 79 are configured to perform accurate operations to reliably feed the bolt 1 to the electrode 10, and hence are each formed of a precision mechanism. Those components with such characteristics are liable to be damaged by being subjected to high impact when the welding machine 5 having a large mass is moved along the abnormal trajectory and, for example, collides against or comes into contact with the steel plate workpiece 94, the machine frame, or other components. For example, in a case where the welding machine 5 welds parts such as the projection bolt to the automotive floor panel, the welding machine 5 mainly comprising the lower arm member 6 and the upper arm member 7 is increased in size. Meanwhile, the components such as the feed rod 80 and the pneumatic cylinder 79 serve as the precision devices. When those components being the precision devices are subjected to impact in such a case, those components are significantly damaged. As a result, proper feeding of bolts can be interfered. In this embodiment, the protective structure as described above is employed. Thus, the parts-feeding device 100 that is liable to be damaged is reliably protected, and a parts-feed function is prevented from being impaired.

In plan view, a clearance between the protective member 57 and the lower arm member 6 is set smaller on a side close to the electrode 10.

Typically, the welding machine 5 enters a narrow site, and accurately welds the parts at predetermined positions on the steel plate workpiece 94. In such an environment, the clearance between the protective member 57 and the lower arm member 6 is set smaller on a side close to the electrode 10 in plan view, and hence the welding machine can easily enter the narrow site in which restrictions of space are severe. At the same time, interference with adjacent members can be easily prevented. In other words, the parts-feeding device 100 can be prevented from entering the narrow site or interfering with the adjacent members in this way because the parts-feeding device 100 is protected from both sides by the protective member 57 and the lower arm member 6, and the vertical proximal member 57 and the lower arm member 6 are arranged in the V-shape in plan view.

The components of the parts-feeding device 100 are arranged in order as described above. With this, the feed hose 67 configured to guide the parts from the parts feeder 65, the stop-and-pass unit 64 or the feeding tube 110, and other components can be arranged substantially parallel to the lower arm member 6 or the upper arm member 7. Thus, a group of those components is compactified. In particular, the feed hose 67 can be prevented from coming into contact with adjacent members. Further, in order to feed the parts to the electrode 10, the bolt feeding unit 78 or the nut feeding unit 78A needs to be inclined in the two directions with the angle $\theta 2$ and the angle $\theta 3$ with respect to the lower arm member 6 or the upper arm member 7. The intermediate bracket 59 having a function to set those inclination angles is fixed to the vertical proximal member 57. Thus, the main components of the parts-feeding device 100 are compactly arranged. In particular, the stop-and-pass unit 64, the feeding tube 110, and the feed hose 67 are arranged substantially parallel to the lower arm member 6 or the upper arm member 7 in plan view. Thus, with respect to such basic arrangement, the bolt feeding unit 78 or the nut feeding unit 78A, the intermediate bracket 59, and the protective member 57, 101, or 102 are arranged adjacent to each other in this order. With this, the entirety of the parts-feeding device 100 is formed into a compact group within the protective structure.

The functions and effects obtained by the arrangement of the feed hose are as follows.

In order that the feed hose 67 extending from the parts feeder 65 serving as the parts-feed source to the parts-feeding device 100 extends in the direction substantially the same as the longitudinal direction of the lower arm member 6, and that the feed hose 67 is unchanged in position relative to the lower arm member 6 in the direction of the clearance between the feed hose 67 and the lower arm member 6, the feed hose 67 is mounted to the lower arm member 6 with the fasteners 128.

In this way, the arrangement position of the feed hose 7 is substantially the same as the longitudinal direction of the lower arm member 6, and the predetermined clearance between the lower arm member 6 and the feed hose 67 is unchanged. Thus, the feed hose 67 is not displaced, for example, by a centrifugal force at the time of moving the welding machine 5, and hence is prevented, for example, from coming into contact with the adjacent members. The feed hose 67 extending from the parts feeder 65 may have a distance of 10 m or more between the parts feeder 65 and the welding machine 5. However, even when the feed hose 67 extends over such a long distance, a space for moving the feed hose 67 with the moving operation of the robot device 14 can be sufficiently secured, and hence the feed hose 67 is allowed to smoothly follow the upward turning, the downward turning, the rightward turning, and the leftward turning of the welding machine 5. Meanwhile, when the feed hose 67 is mounted to the welding machine 5, the feed hose 67 is liable to come into contact, for example, with the lower arm member 6 or the mounting structure section 200 of the parts-feeding device 100. In this embodiment, the relative position of the feed hose 67 and the lower arm member 6 is unchanged as described above. Thus, the problem of the contact is solved.

The feed hose 67 is mounted to the lower arm member 6 with the fasteners 128. Thus, the feed hose 67 can be arranged in a predetermined posture without coming into contact, for example, with the parts-feeding device 100 and the mounting structure section 200 in the vicinity of the lower arm member 6. With this, the feed hose 67 can be prevented from interfering with the complicated adjacent structural portions. In other words, the feed hose 67 can be immovably arranged as part of the welding machine 5. Further, the feed hose 67 can be freely deformed, for example, into a curved shape or a twisted shape between the welding machine 5 and the parts feeder 65.

In addition, the parts-feeding device 100 and the mounting structure section 200 therefor are collectively assembled to the lower arm member 6. Thus, when the feed hose 67 is mounted to the lower arm member 6 at such a collective assemblage position, a group of the welding machine 5 comprising the parts-feeding device 100 is compactified.

The feed hose 67 is arranged within the space along the lower arm member 6. The horizontal width W1 of this space is set equal to the clearance between the lower arm member 6 and the outer part 137 of the parts-feeding device 100. In other words, for example, when the welding machine 5 is advanced by the robot device 14, the feed hose 67 is arranged in a space behind the parts-feeding device 100. Thus, the feed hose 67 is located behind the parts-feeding device 100, and the parts-feeding device 100 functions to protect the feed hose 67. With this, at the time of moving the welding machine, the feed hose 67 does not come into contact with the adjacent members, and hence can be prevented from being damaged.

The vertical width W2 of the space is set equal to the clearance between the lower arm member 6 and the outer part 138 of the mounting structure section 200. In other words, for example, when the welding machine 5 is advanced by the robot device 14, the feed hose 67 is located within a composite space formed of a rear space of the parts-feeding device 100 as viewed in the horizontal direction, and a rear space between the lower arm member 6 and the outer part 138 of the mounting structure section 200 as viewed in the vertical direction. In other words, the feed hose 67 is arranged within the imaginary space having the horizontal width W1 and the vertical width W2. Thus, when the welding machine 5 is advanced, the feed hose 67 is located behind the parts-feeding device 100 and the mounting structure section 200, and hence is prevented from coming into contact with the adjacent members.

As is apparent from FIG. 5A, in plan view, the feed hose 67 is arranged within the elongated space having a width equal to a clearance between the pneumatic cylinder 79 and the lower arm member 6. Thus, the parts-feeding device 100 comprising the feed hose 67 can be formed to be compact.

Second Embodiment

Figure 10:
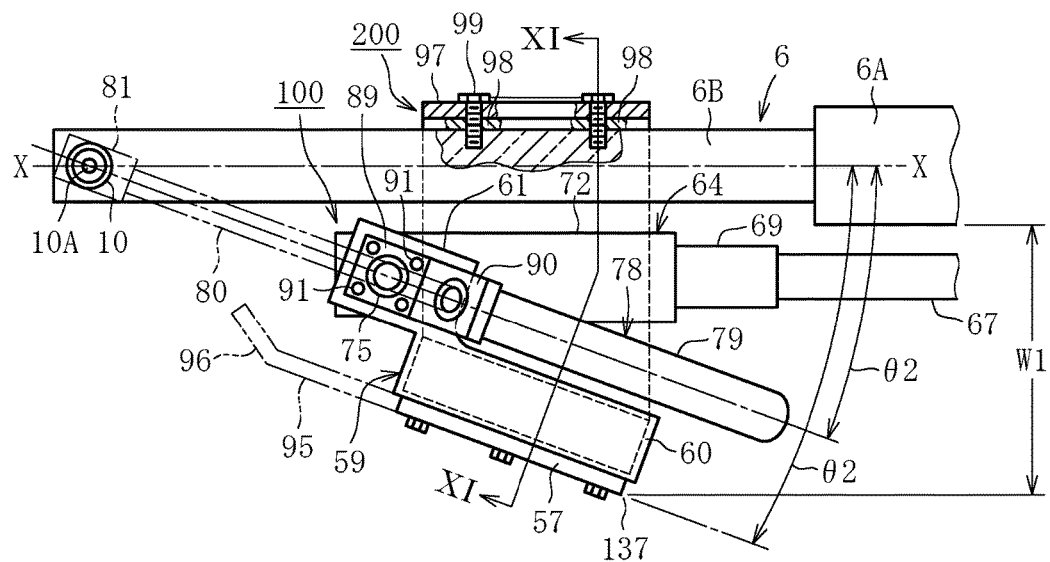
FIG. 10 is a plan view for illustrating an entirety of a parts-feeding device having another structure.
Figure 11:
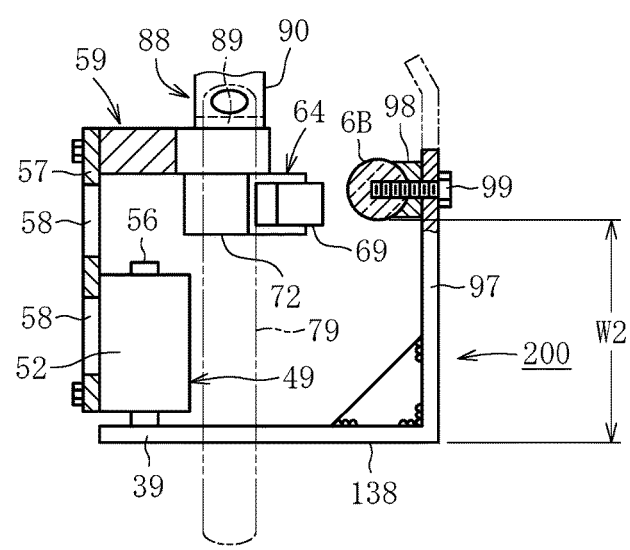
FIG. 11 is a sectional view taken along the line XI-XI of FIG. 10.

FIG. 10 and FIG. 11 are illustrations of the second embodiment of the present invention.

In the first embodiment described above, the parts-feeding device 100 is coupled to the high-rigidity portion 6A through intermediation of the support member 16 comprising the vertical member 16A and the horizontal member 16B. The parts-feeding device 100 is protected by the vertical proximal member 57 and the lower arm member 6 as described above. With focus on such a protective function, members such as the support member 16 are merely a unit configured to allow the parts-feeding device 100 to be mounted to the lower arm member 6. In other words, the support member 16 formed through machining of a bar member corresponds to a mounter configured to mount the parts-feeding device 100 to the lower arm member 6. That is, the assemblage of the support member 16, the vertical member coupling portion 17, and the horizontal member coupling portion 38 forms the mounting structure section 200.

Meanwhile, in the second embodiment, the protective function described above is unchanged, and only the mounting structure section 200 that serves as the mounter is different from the first embodiment. Specifically, the plate-like horizontal proximal member 39 is extended in the horizontal direction and raised in the vertical direction so as to form a coupling member 97, and this coupling member 97 is coupled to the electrode bar 6B. The electrode bar 6B is a rod-like member. Thus, in order to prevent rotation of the electrode bar 6B, a spacer member 98 is interposed, and the electrode bar 6B is fastened with a fixing bolt 99.

Also in the second embodiment, the protective member is constructed by the vertical proximal member 57 forming part of the parts-feeding device 100. As indicated by the two-dot chain lines in FIG. 11, an upper end of the coupling member 97 may be extended upward so as to support the protective function of the lower arm member 6. Other structural features, including portions not illustrated, are the same as those of the first embodiment described above, and members having similar functions are denoted by the same reference numerals.

With such a configuration, the advantages in the arrangement of the feed hose 67 and the function to protect the parts-feeding device 100 are the same as those of the first embodiment.

Third Embodiment

Figure 12:
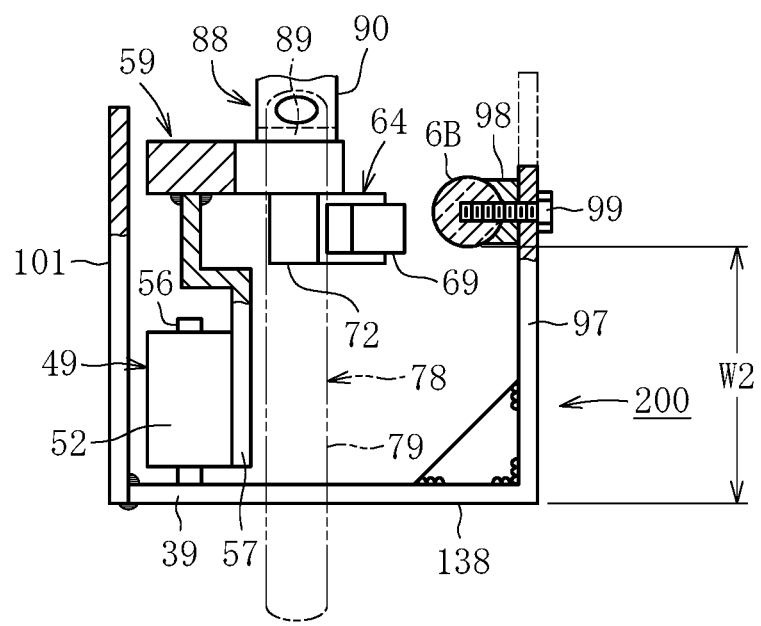
FIG. 12 is a sectional view for illustrating another structural example as in FIG. 11.
Figure 13A:
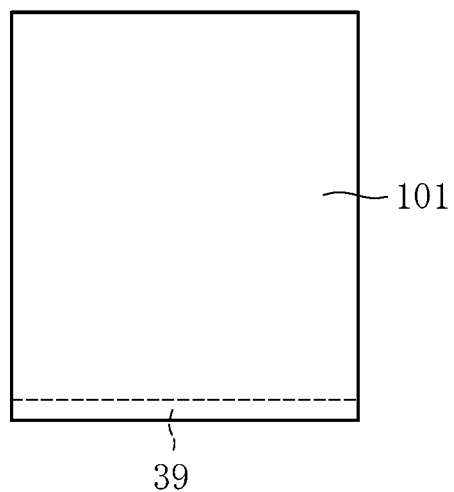
FIG. 13A is a view for illustrating an example of a protective member.
Figure 13B:
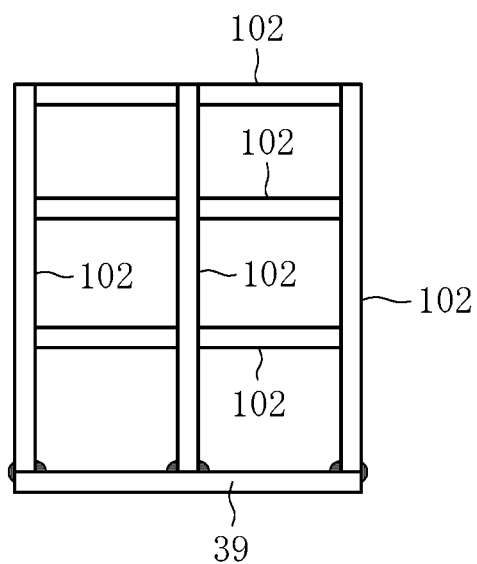
FIG. 13B is a view for illustrating another example of the protective member.

FIG. 12, FIG. 13A, and FIG. 13B are illustrations of the third embodiment of the present invention.

In the first embodiment and the second embodiment described above, the protective member is constructed by the vertical proximal member 57 being part of the parts-feeding device 100. In other words, the vertical proximal member 57 has the protective function, and in addition, a function to integrate the pneumatic cylinder 49 with the intermediate bracket 59, the bolt feeding unit 78, the stop-and-pass unit 64, and other components. Meanwhile, in the third embodiment, the member dedicated for the protective function is arranged, and the vertical proximal member 57 is changed in arrangement.

The vertical proximal member 57 is coupled to the right side of the pneumatic cylinder 49, and the upper portion thereof is welded to the lower side of the intermediate bracket 59. The protective plate 101 serving as the protective member is welded to the horizontal proximal member 39, and raised upward in the vertical direction. Thus, the horizontal proximal member 39 is a member included in the mounting structure section 200, and hence the protective plate 101 welded to the horizontal proximal member 39 is coupled to the mounting structure section 200. Other configurations, including portions not illustrated, are the same as those of the second embodiment described above, and members having similar functions are denoted by the same reference numerals.

FIG. 13A is a view for illustrating a shape of the protective member 101. Further, in FIG. 13B, the plurality of bar members 102 arranged instead of the plate-like protective member are coupled to each other vertically and horizontally. In addition, although illustration is omitted, a combination of a frame member and a wire net may be employed.

The functions and effects of this embodiment are the same as those of the first embodiment and the second embodiment described above.

Fourth Embodiment

FIG. 14, FIG. 15, and FIG. 16A to FIG. 16C are illustrations of the fourth embodiment of the present invention.

In the first embodiment to the third embodiment described above, projection bolts are subjected to welding. In the fourth embodiment, projection nuts are subjected to welding.

A shape of the projection nut is described.

Figure 16A:
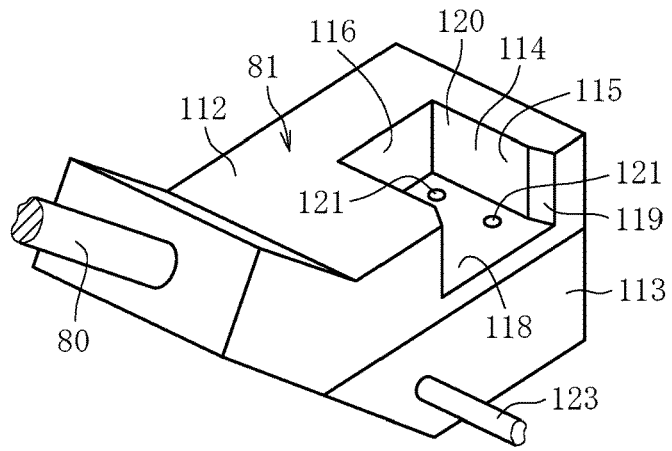
FIG. 16A is a perspective view for illustrating a state in which a holding head is inverted upside down.
Figure 16B:
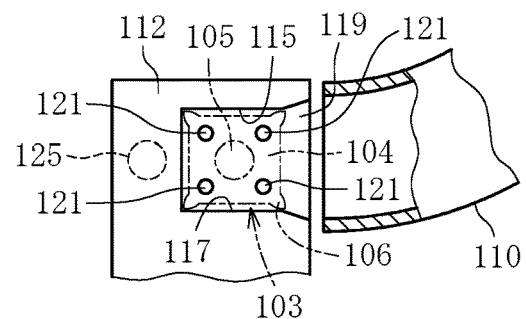
FIG. 16B is a bottom view for illustrating the holding head.
Figure 16C:
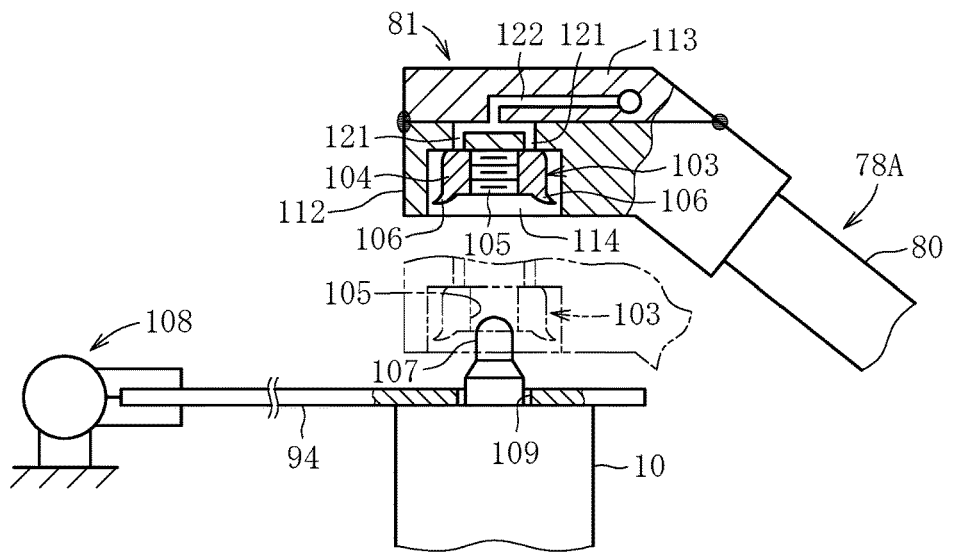
FIG. 16C is a sectional view for illustrating the holding head.

As illustrated in FIG. 16B and FIG. 16C, a projection nut 103 made of iron comprises a quadrangular nut body 104. A threaded hole 105 is formed through a center of the nut body 104, and welding projections 106 are formed at four corners on one side of the nut body 104. The projection nut 103 has the following dimensions. The nut body 104 has a length of 12 mm on each side and a thickness of 7 mm. The threaded hole 105 has an inner diameter of 6 mm. In the following description, the projection nut is simply referred to as a nut in some cases.

As illustrated in FIG. 16C, a guide pin 107 is arranged at a central portion of the electrode 10. A pilot hole 109 is formed through the steel plate workpiece 94 held in a stationary state by a holding mechanism 108. This steel plate workpiece 94 is placed on the electrode 10 moved by the robot device 14. In this state, the guide pin 107 is passed through the pilot hole 109 of the steel plate workpiece 94. When the nut 103 is fed, the guide pin 107 relatively enters the threaded hole 105. In this state, the electrode 11 is advanced, and the welding current is conducted. With this, welding of the nut is completed.

Next, feeding of the nut is described.

The feeding tube 110 made of stainless steel is formed into a curved and rectangular shape in cross-section so as to conform to the shape of the nut 103. This feeding tube 110 is arranged along the lower arm member 6, and fixed onto the projection portion 61 of the intermediate bracket 59 through intermediation of a bracket 111. A method of fixing thereat is welding. The fixing portion 89 of the inclined mounting member 88 is fixed, for example, with bolts to the lower side of the intermediate bracket 59. The feed hose 67 joined to the feeding tube 110 is also formed into a rectangular shape in cross-section. Thus, the holding portion 132 of each of the fasteners 128 is also formed into a rectangular shape in cross-section.

Next, the holding head is described.

The holding head 81 is illustrated in FIG. 16A to FIG. 16C. In the illustrations of FIG. 16A and FIG. 16B, for the sake of better visibility, the holding head 81 is inverted upside down. Due to conditions for machining and assembly of other portions, a lower member 112 and an upper member 113 are coupled to each other. The lower member 112 and the upper member 113 are each manufactured through machining of a block-like stainless steel member, and a holding recess portion 114 is formed in the lower member 112. The holding recess portion 114 is a receiving space having three sides surrounded by holding walls 115, 116, and 117, and a top surface 118 for allowing the nut 103 to be seated thereon. The holding recess portion 114 comprises an introduction opening portion 119 formed into a shape of being opened on a lateral side of the holding recess portion 114 so as to allow entry of the nut 103. The top surface 118 is arranged in the horizontal direction.

Figure 14:
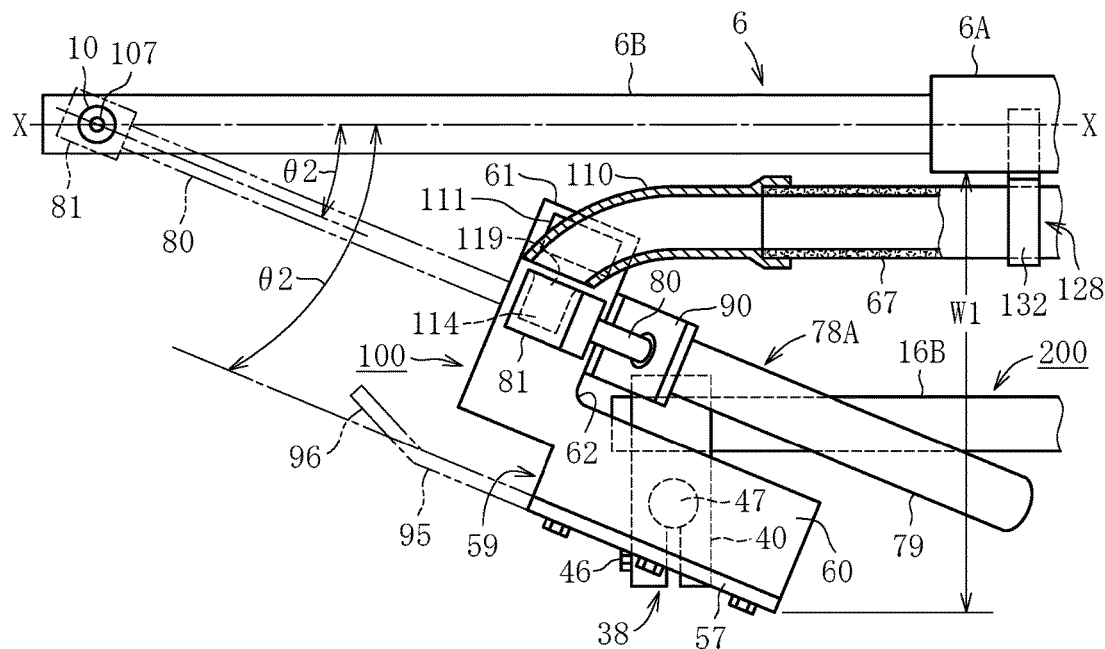
FIG. 14 is a plan view for illustrating an entirety of another parts-feeding device.

A relative position of the introduction opening portion 119 and the feeding tube 110 is set such that, under a state in which the feed rod 80 is maximally retracted, and the holding head 81 is stopped at a waiting position, as illustrated in FIG. 14 and FIG. 16B, the introduction opening portion 119 is communicated to an outlet part of the feeding tube 110. Further, the holding wall 116 on a depth side with respect to the introduction opening portion 119 serves as a stopper surface for the nut 103 to enter.

Further, a release opening portion 120 configured to allow the nut 103 to be released to the guide pin 107 is formed in a lower portion of the holding recess portion 114. Thus, the nut 103 enters from a lateral side of the holding recess portion 114 through the introduction opening portion 119, and then is released toward the guide pin 107 through the release opening portion 120.

Four air jet ports 121 are formed through a bottom surface 118 such that jets through the air jet ports 121 are blown to four positions on an end surface of the nut 103. There are a plurality of blowing positions, and positions of the air jet ports 121 are selected so as to prevent the nut 103 from being inclined. In other words, a dynamic pressure of the jetted air is applied uniformly to the end surface of the nut 103. In this embodiment, air is jetted to positions near the four corners of the end surface.

Figure 15:
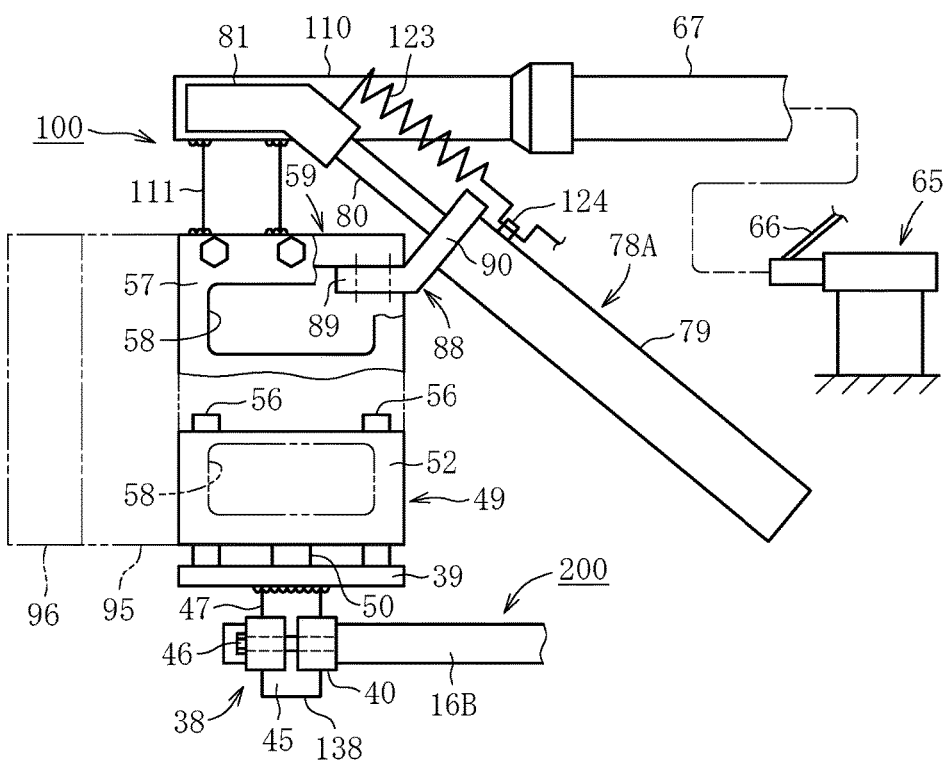
FIG. 15 is a side view for illustrating an entirety of another parts-feeding device.

In order to jet the air uniformly through the four air jet ports 121, an air passage is formed in the upper member 113. As illustrated in FIG. 16C, an air passage 122 formed in the upper member 113 is communicated to the four air jet ports 121 formed in the lower member 112. The upper member 113 and the lower member 112 are integrated with each other through welding such that the air passage 122 is communicated to the air jet ports 121. Further, an air hose 123 is connected to the air passage 122. In order to expand and contract the air hose 123 in conjunction with advancement and retraction of the holding head 81, as illustrated in FIG. 15, the air hose 123 is formed into a shape of an expandable coil, and mounted to the pneumatic cylinder 79 with a fastener 124. Another end of the air hose 123 is connected to an air switching valve (not shown).

As a releaser configured to release the nut 103 from the holding recess portion 114, the air jet system is employed as described above. Alternatively, a pushing member configured to be advanced and retracted, for example, by a solenoid or a pneumatic cylinder may be employed.

As indicated by the chain line in FIG. 16B, in order to introduce the nut 103 through the introduction opening portion 119 into the holding recess portion 114, a permanent magnet 125 is embedded in the lower member 112. When the nut 103 conveyed by the air from the parts feeder 65 reaches the outlet part of the feeding tube 110, an attractive force of the permanent magnet 125 is applied to the nut 103, and causes the nut 103 to be drawn into the holding recess portion 114. With this, the nut 103 is attracted onto the holding wall 116 serving as a stopper surface.

In the fourth embodiment, although illustration is omitted, the vertical member coupling portion 17 is adjusted so as to lower a height position of the holding head 81, to thereby also lower the position of the feed hose 67. With this, the feed hose 67 is located within the range of the space height W2. Other structural features, including portions not illustrated, are the same as those of the first embodiment described above, and members having similar functions are denoted by the same reference numerals.

Although the mounting structure section 200 of the fourth embodiment is the same as that of the first embodiment, this mounting structure section 200 may alternatively be configured as in the second embodiment or the third embodiment.

Next, an operation of feeding a nut is described.

As described above, the holding head 81 in which the nut 103 is held within the holding recess portion 114 by the magnet 125 is advanced. The advancement of the holding head 81 is stopped at a position where the threaded hole 105 is coaxial with the guide pin 107. Then, the pneumatic cylinder 49 is actuated so as to lower the nut feeding unit 78A. With this, the guide pin 107 relatively enters the threaded hole 105 of the nut 103. When an entry distance becomes small as indicated by the two-dot chain lines in FIG. 16C, the lowering movement of the pneumatic cylinder 49 is stopped. After the stopping, the air is jetted through the air jet ports 121. This jet causes the four positions on the end surface of the nut to be pushed out by the air flow. With this, the nut 103 is held by the guide pin 107.

After that, the holding head 81 is moved in the reverse order such that the holding head 81 waits for arrival of a subsequent nut 103. Next, the electrode 11 is advanced, and the welding projections 106 are pressurized against the steel plate workpiece 94. In this state, the welding current is conducted. With this, the welding projections 106 are welded to the steel plate workpiece 94.

The functions and effects of this fourth embodiment are the same as those of each of the embodiments described above.

INDUSTRIAL APPLICABILITY

As described above, according to the structures of the present invention, in the welding apparatus, which is configured such that the welding machine comprising the lower arm member or the upper arm member is moved by the robot device, the parts-feeding device is mounted to the lower arm member or the upper arm member through intermediation of the support member comprising the vertical member and the horizontal member, part of the parts-feeding device and any one of the arm members serve as the protective structure, and the feed hose is properly and securely mounted to the any one of the arm members. With this, stable mounting of the parts-feeding device, protection of the parts-feeding device, proper mounting of the feed hose, and other similar advantages can be achieved. Therefore, the structures of the present invention are applicable to various industrial fields, specifically, to a step of welding automotive vehicle bodies, and a step of welding metal plates of household appliances.

REFERENCE SIGNS LIST 1 projection bolt
2 shaft portion
3 flange portion
4 welding projection
5 welding machine
6 lower arm member
7 upper arm member
10 electrode
11 electrode
14 robot device
16 support member
16A vertical member
16B horizontal member
17 vertical member coupling portion
38 vertical member coupling portion
39 horizontal proximal member
49 insertion driver, pneumatic cylinder
52 cylinder body
57 vertical proximal member, protection member
59 intermediate bracket
64 stop-and-pass unit
67 feed hose
78 bolt feeding unit
78A nut feeding unit
80 feed rod
81 holding head
94 steel plate workpiece
97 coupling member
100 parts-feeding device
101 protective plate
102 bar member
103 projection nut
128 fastener
137 outer part
138 outer part
200 mounting structure section
W1 space width
W2 space height

The invention claimed is:

1. A welding apparatus, comprising:
   a welding machine comprising:
      a lower arm member extending in a horizontal direction and comprising an electrode arranged at a distal end side of the lower arm member; and
      an upper arm member extending in the horizontal direction and comprising an electrode arranged at a distal end side of the upper arm member,
      the welding machine being configured to cause any one or both of the electrodes to advance and retreat;
   a robot device to which the welding machine is mounted;
   a support member comprising:
      a vertical member arranged in a vertical direction; and
      a horizontal member arranged in the horizontal direction,
      the vertical member being mounted on one of the lower arm member and the upper arm member at a position away from the electrode of the one of the lower arm member and the upper arm member, the horizontal member extending from the vertical member along the one of the lower arm member and the upper arm member;
   a parts-feeding device mounted to the horizontal member and configured to feed parts to be welded to a steel plate workpiece to the electrode of the one of the lower arm member and the upper arm member; and
   a feed hose extending from a parts-feed source to the parts-feeding device,
   wherein the feed hose is mounted to the one of the lower arm member and the upper arm member with a fastener such that the feed hose extends in a direction that is a same as a longitudinal direction of the one of the lower arm member and the upper arm member, and the feed hose is unchanged in position relative to the one of the lower arm member and the upper arm member in a direction of a clearance between the feed hose and the one of the lower arm member and the upper arm member.

2. The welding apparatus according to claim 1,
   wherein the vertical member is mounted to the one of the lower arm member and the upper arm member such that the vertical member is adjustable in position in the vertical direction, and
   wherein the parts-feeding device is mounted to the horizontal member such that the parts-feeding device is adjustable in position in the horizontal direction.

3. The welding apparatus according to claim 1,
   wherein the parts-feeding device is protected from both sides by a part of the parts-feeding device or a protective member coupled to the support member, and by the one of the lower arm member and the upper arm member.

4. The welding apparatus according to claim 3,
   wherein, in plan view, a clearance between the part of the parts-feeding device or the protective member and the one of the lower arm member and the upper arm member is set so that the clearance becomes smaller on a side close to the electrodes.

5. The welding apparatus according to claim 1,
   wherein the feed hose is arranged within a space along the one of the lower arm member and the upper arm member, and
   wherein a horizontal width of the space is set equal to a clearance between the one of the lower arm member and the upper arm member and an outer part of the parts-feeding device.

6. The welding apparatus according to claim 5,
   wherein a vertical width of the space is set equal to a clearance between the one of the lower arm member and the upper arm member and an outer part of a mounting structure section through which the parts-feeding device is mounted to the one of the lower arm member and the upper arm member.

7. The welding apparatus according to claim 2,
   wherein the parts-feeding device is protected from both sides by a part of the parts-feeding device or a protective member coupled to the support member, and by the one of the lower arm member and the upper arm member.

* * * * *